(12) United States Patent
Tarabzouni et al.

(10) Patent No.: US 7,359,931 B2
(45) Date of Patent: Apr. 15, 2008

(54) SYSTEM TO FACILITATE PIPELINE MANAGEMENT, SOFTWARE, AND RELATED METHODS

(75) Inventors: Thamer K. Tarabzouni, Dhahran (SA); Abdulaziz K. Al-Mejna, Dhahran (SA); Howard Wood, Darlington (GB)

(73) Assignee: Saudi Arabian Oil Company, Dhahran (SA)

( * ) Notice: Subject to any disclaimer, the term of this patent is extended or adjusted under 35 U.S.C. 154(b) by 945 days.

(21) Appl. No.: 10/787,779

(22) Filed: Feb. 26, 2004

(65) Prior Publication Data

US 2005/0038825 A1 Feb. 17, 2005

Related U.S. Application Data

(60) Provisional application No. 60/495,546, filed on Aug. 15, 2003.

(51) Int. Cl.
*G06F 15/16* (2006.01)
*G01V 3/00* (2006.01)

(52) U.S. Cl. .............. 709/200; 702/2; 702/5; 702/51

(58) Field of Classification Search .......... 709/200; 715/850; 702/2, 533, 51
See application file for complete search history.

(56) References Cited

U.S. PATENT DOCUMENTS

| 4,796,466 A * | 1/1989 | Farmer .................. 73/40.5 R |
| 5,784,540 A | 7/1998 | Faltings |
| 5,825,003 A | 10/1998 | Jennings et al. |
| 6,047,281 A | 4/2000 | Wilson et al. |
| 6,243,483 B1 | 6/2001 | Petrou et al. |
| 6,359,434 B1 | 3/2002 | Winslow et al. |
| 6,683,614 B2 | 1/2004 | Walls et al. |
| 6,920,618 B2 | 7/2005 | Walls et al. |
| 2002/0042700 A1 * | 4/2002 | Giles et al. ................. 703/6 |
| 2002/0135591 A1 | 9/2002 | Zhang |
| 2002/0143469 A1 | 10/2002 | Alexander et al. |
| 2004/0088113 A1 * | 5/2004 | Spoonhower et al. ......... 702/2 |

OTHER PUBLICATIONS

Author, Al-Mejna;Saudi Aramco Handout Titled "Pipelines'GIS Emergency Recovery System" presented at conference.

* cited by examiner

*Primary Examiner*—Kenny Lin
(74) *Attorney, Agent, or Firm*—Bracewell & Giuliani LLP

(57) ABSTRACT

A system for facilitating pipeline management, software, and methods are provided. The system includes a pipeline company computer positioned at a pipeline company site to define a pipeline company server, having a processor, memory coupled to the processor to store software and database records therein, a graphical display coupled to the processor for displaying graphical images and a user interface coupled to the processor to provide a user access to manipulate the software and database records, and pipeline information management analyzing software to analyze pipeline management requirements. The system also includes an area network in communication with the server, a remote user computer in communication with the area network, positioned remote from the server at remote site, and positioned to access the pipeline information management analyzing software, and a portable user computer adapted to interface with the area network to access the pipeline information management analyzing software to provide the field user access to the server database.

60 Claims, 18 Drawing Sheets

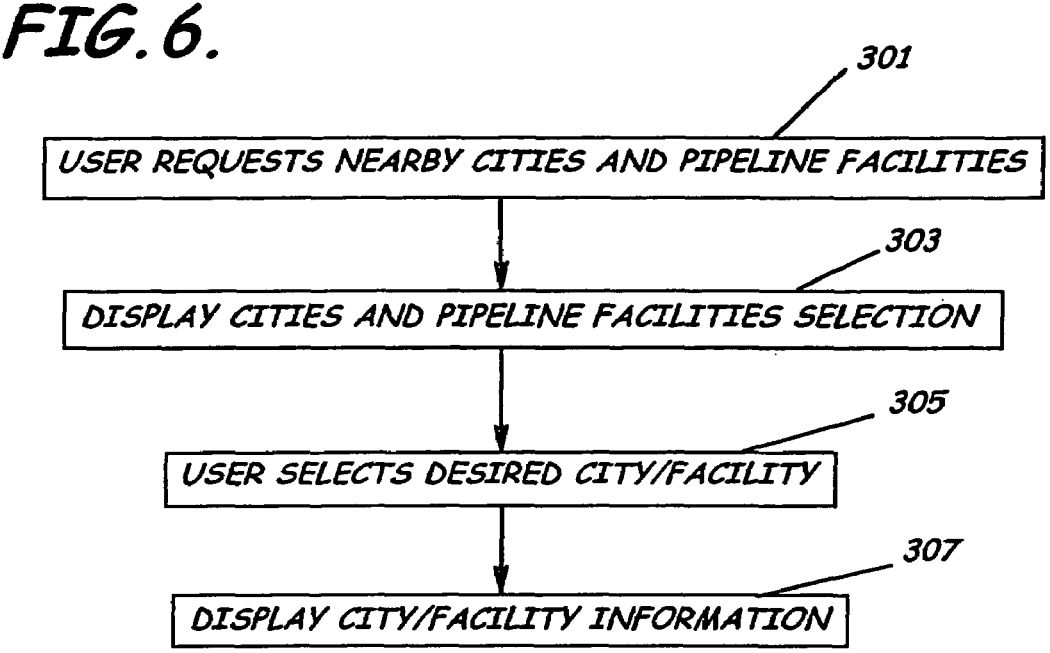
FIG.6. CITIES/FACILITIES REVIEW
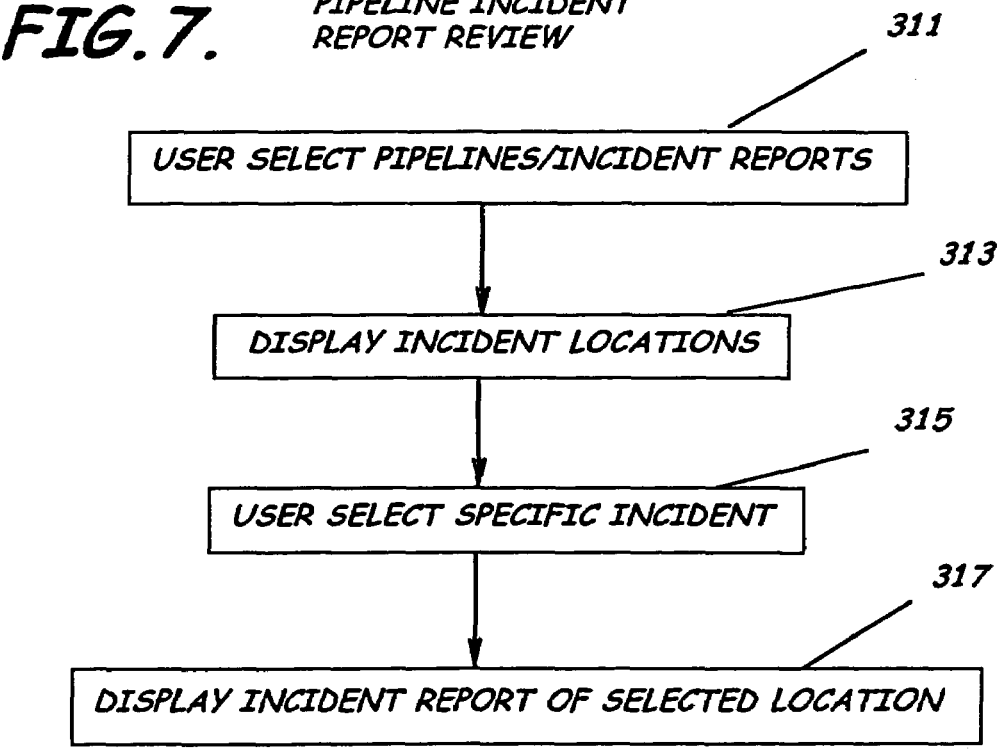
FIG.7. PIPELINE INCIDENT REPORT REVIEW

US 7,359,931 B2

SYSTEM TO FACILITATE PIPELINE MANAGEMENT, SOFTWARE, AND RELATED METHODS

RELATED APPLICATIONS

This application claims the benefit of provisional patent application No. 60/495,546 filed on Aug. 15, 2003.

BACKGROUND OF THE INVENTION

1. Field of the Invention

The present invention relates generally to the pipeline industry. In more specific aspects, the present invention relates to pipeline geographic information systems, software, and methods.

2. Description of the Related Art

During the late 1970s, emerging computer technology resulted in computer mapmaking. The early computer maps included data associated with a geographical location. By the early 1980s, as computer technology became more advanced and less expensive, geographic information systems (GIS) emerged. A graphical information system is basically a system capable of assembling, storing, manipulating, and displaying geographically referenced information or data identified according to a location. Modern geographical information systems are capable of integrating maps made from the same scales, overlaying different types of maps on a particular area to make a new map that combines the attributes of the individual maps, and generating buffer or proximities around points, lines or polygons on a map. Geographic information systems generally have two primary data structures: "raster" where special features are stored as an array of regularly spaced cells; and "vector" where spatial features are represented by either points, lines, or polygons. Much of the geographic data used in geographic information systems is captured from digitized maps, digitized satellite imagery, and aerial photographs.

Many companies are beginning to recognize the benefit of tracking pipeline assets using geographic information systems and are already using Computer-Aided Design Drafting (CADD) software which can be used to build some components of a geographic information system, such as the production of base maps, pipeline alignment sheets, and pipeline facility drawings. The user merely assigns geographic reference criteria to each element stored in the geographic information systems database. As part of the development of a geographic information system, many companies are instituting Electronic Document Management Systems. This allows for drawings or data sheets to be geographically linked. Also, as part of the development of a geographic information system, many companies are implementing Global Positioning System (GPS) surveying. This can be accomplished, for example, by a surveyor carrying a portable GPS receiver, whereby the surveyor moves from point-to-point and stores the individual coordinates of the various physical structures to be entered into a geographical information systems database.

Applicants have recognized that hydrocarbon pipeline distribution networks may readily lend themselves to tracking on a geographic basis. When implemented with respect to pipeline networks, the geographic information system can allow a user to pan through the digital image of the pipeline network and select specific pipelines or segments of pipelines to display attribute information. Applicants also have recognized that, following the trend toward the paperless office, data resources, in particular technical data and reference material, can be linked with the various pipeline components having corresponding geographical locations to provide the user technical data for the selected pipeline component.

Pipelines crossareas range from remote to highly populated. Applicants have recognized a need to take precautions to enhance smooth recovery and minimize associated risk in an emergency situation. In order to meet these objectives, Applicants have recognized a need for instant and continuous access to current and historical information related to the various pipeline features and upstream or downstream equipment directly or indirectly connected to a pipeline that has operational or environmental constraints. Based on these objectives, Applicants have explored the use of geographic information systems technology to develop an emergency response system.

A first step in developing a design concept was to define the scope of an emergency response system. Considerations included the complexity of the pipeline operation and the recognized need to simplify the retrieval of information and minimize or eliminate information retrieval time. The next step was then to determine the proper geographic information systems platform. Consideration in determining the proper base geographic information system software included the recognized need to quickly respond to user inquiries, especially from remote user sites and to interface with current databases (pipeline data records and digital maps). The Applicants recognized that none of the available software packages were alone capable of satisfying Applicants' objectives.

The next step in developing the design concept was to examine existing digitized computer-aided design drafting (CADD) maps and electronic pipelines technical data (EPTD) which hold physical engineering pipeline assets characteristics for implementation with base geographic information system software. In an early design concept of an Emergency Recovery System using a pipeline geographic information system (Phase I), the idea was introduced to design a system that would theoretically allow a user to retrieve data within a selected operational area. The user would be provided the ability to find a particular predetermined pipeline location and retrieve any features or information belonging to the location. By setting a buffer zone boundary around the pipeline, the design would theoretically attempt to provide a user a representation of a rupture exposure radius coverage area for a pipeline and theoretically provide the ability to inquire about any features within the highlighted area such as how many valves exist within the selected rupture exposure radius. The early concept also included the desire for the system to display critical and engineering drawings like valve operating diagrams, safety instruction sheets, and process and instrument diagrams. The early design concept also included the desire to provide the user the ability to determine upstream or downstream isolation valves to isolate a rupture, to provide information on operational area contact persons for the ruptured location, and to provide the user the ability to keep historical and critique reports of any disaster.

In a second concept phase (Phase II), proposed were additional functions that would need to be developed to extend the capability of the Emergency Recovery System to form a more comprehensive pipelines geographic information system, beyond that of just an Emergency Recovery System. Proposed was the addition of a database including inspection, operation and maintenance data of the pipeline network, the ability to display corrosion or scraping data to help effectively plan and execute required pipeline repairs, and the ability to develop intuitive predictive maintenance analysis. For example, the user could highlight an area of intensive corrosion rates which will enable protective maintenance activities or could develop a maintenance repair plan where corrosion indications are related to geographical locations.

Proposed additional functions also included a link to external resources to locate the nearest support government agencies. The proposed concept also included assigning a dollar value to various real estate based on selected criteria such as soil type in order to plan the most cost-effective routing of new pipelines or the development of routing contingencies. The proposed concept also involved the desire to implement the use of a GPS with field workers to allow the workers to locate assets. Also proposed was the use of handheld computers with GPS to provide the field worker or inspector with customized mobile digital maps showing the exact position of the work location and to enable them to inquire and store related data. The proposed concept also involved the use of GPS technology to provide a unique reference point to relate pipeline information like that associated with cathodic protection systems, and maintenance and inspection data. Additionally, proposed was the use of scrapers implemented and based on GPS technology for precisely locating a net loss indication or corrosion (both external and internal) and cracks.

As such, Applicants have recognized there still exists a need for a geographic-based pipeline management system, software and methods that actually can be implemented to represent the pipeline network on digital area maps and integrate the pipelines with related technical, maintenance, and operations database records. Applicants also recognize a need for a pipeline management system, software, and methods to provide a single source of information to be referenced instead of maintaining several systems or hardcopies in all remote locations and with concerned employees, which makes the update and tracking of these copies a difficult activity; to provide online engineering data and drawings necessary to recover from emergency situations; and to provide for the integration of additional technologies such as the Personal Computer (PC) or Pocket PC, GPS, satellite imaging analysis, and field data monitoring to extend the availability of critical data to remote and field workers, and to assist in better decision-making at management level.

SUMMARY OF THE INVENTION

In view of the foregoing, an embodiment of the present invention advantageously provides a system, software, and methods that provide the user the ability to do analysis on current and historical pipeline data and pipeline related equipment data to assist in decision making, optimize resources utilization and expenditures, plan and track revalidation activities, and effectively operate pipeline network and maintenance activities. An embodiment of the present invention advantageously provides a pipeline management system to facilitate pipeline management which generally includes a pipeline company computer having a memory, a database stored in the memory of the pipeline company computer, and pipeline information management analyzing software also stored in the memory of the pipeline company computer to analyze pipeline management requirements.

More particularly, the pipeline management system includes a pipeline company computer positioned at a pipeline company site to define a pipeline company server. The server has a processor and memory coupled to the processor to store software and database records. A graphical display can be coupled to the processor for displaying graphical images, and a user interface coupled to the processor to provide a user access to manipulate the software and database records. The system further includes a database, or combination of databases which comprise the database, stored in the memory of the pipeline company server. The database includes a plurality of map segments obtained from geographic sources such as a map, a processed satellite image, or an aerial photograph. The database further includes at least a plurality of pipeline equipment records having at least engineering data, drawings, and location data of pipeline equipment to describe various pieces of pipeline equipment, a plurality of pipeline management records including pipeline equipment management data to describe various operations and maintenance, and a plurality of personnel data records functionally linked to either a pipeline operational area or a specific pipeline or pipeline equipment to describe personnel responsible for various pieces of pipeline equipment and who can be contacted in an emergency.

The system includes pipeline information management analyzing software stored in memory of the server to analyze pipeline management requirements. The pipeline information management analyzing software is adapted to interface with a user. The software includes a pipeline emergency response analyzer to analyze a pipeline emergency. The pipeline emergency response analyzer has at least a pipeline valve location locator positioned to retrieve from the databases a plurality of pipeline equipment records having pipeline valve location data. Advantageously, the pipeline valve location locator is responsive to a geographic reference point entered by a user through the user interface which represents a location of the pipeline emergency or GPS coordinates, to identify at least one immediate upstream valve and at least one immediate downstream valve from the location of the pipeline emergency. Identification of valves located upstream and downstream of an emergency is an important feature because it identifies valves which must be closed in order to isolate a ruptured or leaking pipeline.

The pipeline emergency response analyzer can also have a pipeline segment volume calculator responsive to the pipeline valve location locator determined identity of the immediate upstream and downstream valves. The pipeline segment volume calculator calculates an amount of pipeline segment volume inventory between the upstream and downstream valves to determine potential lost inventory from a pipeline leak or rupture. Knowledge of which valves require closing and correspondingly the type of pipeline equipment the valves are associated with is generally required in order to properly perform a calculation of the potential volume of production fluid contained within the pipeline and any pipeline segments bounded by the valves which require closing. Additionally, knowledge of the potential amount of lost inventory or product is a significant feature because it not only provides for the determination of an economic loss, but also provides an early forecast of the potential environmental impact of the leak or rupture.

The pipeline information management analyzing software can include a pipeline management analyzer positioned to retrieve the pipeline management record from the database and is responsive to a user selecting pipeline equipment through the user interface to display the pipeline management record to the user to provide the user assistance to thereby assist the user in planning and execution of management actions on the user selected pipeline equipment. The user, for example, can select a piece of pipeline or other pipeline equipment and display maintenance records or scheduled maintenance or repairs, current status, or other important piece of documentation necessary to the user to properly manage the pipeline asset. Correspondingly, the user can update the pipeline management record to provide a second user the latest information regarding the pipeline asset.

The pipeline information management analyzing software further includes a critical engineering data and drawings analyzer positioned to retrieve a pipeline equipment record containing critical engineering data and drawings from the database and is responsive to the user selecting pipeline equipment through the user interface to display critical engineering data and drawings for the user selected pipeline equipment. The critical engineering data, including datasheets and drawings aid the user in analyzing the extent of the damage and the feasibility of making repairs. The critical engineering data, datasheets, and drawings not only provide information helpful to prosecuting a pipeline emergency but also provide a manager user the ability to plan for contingency emergency operations and critical or priority maintenance.

Advantageously, the pipeline emergency response analyzer of the pipeline information management analyzing software can include a rupture exposure radius determiner positioned to retrieve at least one map segment and at least one pipeline equipment record from the database and is responsive to a geographic reference point entered by a user through the user interface representing a location of the pipeline rupture to identify a rupture exposure radius coverage area of a pipeline and to provide summary information about pipeline equipment within the rupture exposure radius coverage area. Advantageously, the rupture exposure radius determiner can also enable additional features such as hyperlinks within the rupture area.

Advantageously, the database further can include a plurality of pipeline corrosion records and a plurality of pipeline cathodic protection equipment records. In this configuration, the pipeline information management system analyzing software further includes an instrument scraping pipeline corrosion analyzer positioned to retrieve at least one of the plurality of pipeline corrosion records from the database by a instrument scraping pipeline corrosion identifier stored with the records. The instrument scraping pipeline corrosion analyzer is responsive to the user selecting a pipeline through the user interface to display instrument scraping pipeline corrosion data to assist the user in planning and execution of repairs to the user selected pipeline. The pipeline information management system analyzing software can include a cathodic protection equipment analyzer positioned to retrieve at least one of the plurality of cathodic protection equipment records from the database by a cathodic protection identifier stored with the record. The cathodic protection equipment analyzer is responsive to the user selecting the pipeline through the user interface to display cathodic protection equipment data to assist the user in planning and implementation of cathodic protection resources to the user selected pipeline.

An embodiment of the present invention also advantageously provides pipeline information management analyzing software stored on a storage media to analyze pipeline management requirements. The software includes a pipeline emergency response analyzer to analyze a pipeline emergency. The pipeline emergency response analyzer has a pipeline valve location locator adapted to retrieve a plurality of pipeline equipment records having pipeline valve location data from the database and is adapted to respond to a geographic reference point entered by a user through the user interface which represents a location of the pipeline emergency and is used to identify at least one immediate upstream valve and at least one immediate downstream valve from the location of the pipeline emergency. The valves identified by the pipeline valve location locator are preferably both in-line valve and a non-in-line valves. The valve identification is made to determine which valves should be closed in order to isolate a pipeline leaking or rupture.

Advantageously, the pipeline information management analyzing software also includes a critical engineering data and drawings analyzer adapted to retrieve a pipeline equipment record containing critical engineering data and drawings from the database and adapted to respond to the user selecting pipeline equipment through the user interface to display critical engineering data and drawings for the user selected pipeline equipment.

Advantageously, the pipeline emergency response analyzer of the software can further include a pipeline segment volume calculator responsive to the valve determinations made by the pipeline valve location locator determined that is adapted to calculate an amount of pipeline segment volume inventory between the at least one upstream valve and the at least one downstream valve to thereby determine potential lost inventory from the pipeline leaking or rupture and aid in the determination of a projected environmental impact caused by the leak or rupture.

The emergency response analyzer can also include a rupture exposure radius determiner adapted to retrieve at least one map segment and at least one pipeline equipment record from the database and adapted to respond to a geographic reference point entered by a user through the user interface representing a location of the pipeline rupture. Advantageously, by setting a buffer zone radius, the user can identify a rupture exposure radius coverage area of a pipeline and receive summary information about pipeline equipment within the rupture exposure radius coverage area and enable extended features such as hyperlinks.

In an embodiment of the present invention, the system includes computer readable medium that is readable by a computer to facilitate pipeline management, such as the above described pipeline company server, the computer readable medium comprising a set of instructions that, when executed by the computer, cause the computer to perform the operations of retrieving from a database a plurality of pipeline equipment records having pipeline valve location data and identifying at least one immediate upstream valve and at least one immediate downstream valve from a location of the pipeline rupture in response to a geographic reference point entered by a user through a user interface and representing the location of a pipeline rupture. The instructions also include those for performing the operations of retrieving a pipeline equipment record containing critical engineering data and drawings from the database and displaying critical engineering data and drawings for a user selected pipeline equipment in response to the user selecting the pipeline equipment through the user interface. The instructions can also include those for performing the operations of calculating an amount of pipeline segment volume inventory between the at least one upstream valve and the at least one downstream valve, to thereby determine potential lost inventory from the pipeline rupture, those for identifying a rupture exposure radius coverage area of a pipeline; those for retrieving at least one map segment and at least one pipeline equipment record from the database; and those for providing summary information about pipeline equipment within the rupture exposure radius coverage area, in response to entry by a user through the user interface of a geographic reference point representing a location of the pipeline rupture.

Advantageously, an embodiment of the present invention also provides a method for facilitating pipeline management. The method includes the steps of forming a plurality of digitized map segments defining at least one of a map, a processed satellite image, and an aerial photograph for storage in a database to provide for the display of a geographical relationship between terrain featured in the map segments and a pipeline network, and forming a plurality of pipeline equipment records including at least engineering data, drawings, and location data of pipeline equipment for storage in the database to provide for detailed engineering analysis on the pipeline equipment. The method also includes forming a plurality of pipeline management records including pipeline equipment management data for storage in the database to provide for planning and execution of management actions on the pipeline equipment.

Advantageously, an embodiment of the present invention also provides a method for analyzing a pipeline emergency. The method includes the steps of identifying at least one immediate upstream valve and at least one immediate downstream valve from the location of the pipeline emergency to thereby identify pipeline valves potentially needing to be closed, and displaying critical engineering data and drawings for at least one of an emergency pipeline, the at least one immediate upstream valve, and the at least one immediate downstream valve. The method can also include the step of calculating an amount of pipeline segment volume inventory between the at least one immediate upstream valve and the at least one immediate downstream valve to thereby determine potential lost inventory from the pipeline emergency. Where the pipeline emergency is either an actual or simulated pipeline rupture, the method can also include the step of identifying a rupture exposure radius coverage area of the pipeline to thereby identify an area affected by the pipeline rupture and to obtain summary information about pipeline equipment or the community located within the rupture exposure radius coverage area.

Advantageously, an embodiment of the present invention also includes a functional method for facilitating pipeline management. The method comprising the step of displaying pipeline equipment inspection, operation, and maintenance data stored in at least one of a plurality of pipeline management records in the database for a user selected pipeline equipment to assist in planning and execution of repairs to the user selected pipeline equipment. The method also includes the steps of displaying instrument scraping pipeline corrosion data for a user selected pipeline to assist the user in planning and execution of repairs to the user selected pipeline, and displaying cathodic protection equipment data for the user selected pipeline to assist the user in planning and implementation of cathodic protection resources to the user selected pipeline.

Advantageously an embodiment of the present invention uses GIS-type technology to geographically present the field layout of a pipeline network on computer workstations. Advantageously, the system user can inquire on any pipeline and its related assets either by selection menu or geographically selecting the desired pipeline. Advantageously, a user can obtain and analyze engineering data and drawings related to the selected asset (e.g. pipeline valves). Moreover a user can perform various spatial analyses on these selected assets. The system can provide the capability to display required critical engineering data and drawings and contacts (personnel) assigned to the affected pipeline or other pipeline equipment in case an emergency situation occurs related to the pipeline or other pipeline equipment to expedite response and recovery from emergency situations and incidents. The system can provide a mechanism to locate and display information on valves which may require actuation to isolate the affected/ruptured pipeline to minimize effects of a pipeline emergency on safety and on the environment. Advantageously, the system can provide predictive maintenance analysis based on geographic reference points, cost-effective routing of new pipelines, and precise locating of pipeline assets.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 6 is a flowchart of a method for facilitating pipeline management depicting accessing local city/pipeline facility information according to an embodiment of the present invention;

FIG. 7 is a flowchart of a method for facilitating pipeline management depicting accessing a pipeline incident report according to an embodiment of the present invention;

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments. Also note that the phrase "pipeline equipment" as used herein generally refers to a pipeline and other equipment associated with the pipeline, for example, a pipeline and associated pipeline valves.

Figure 1:
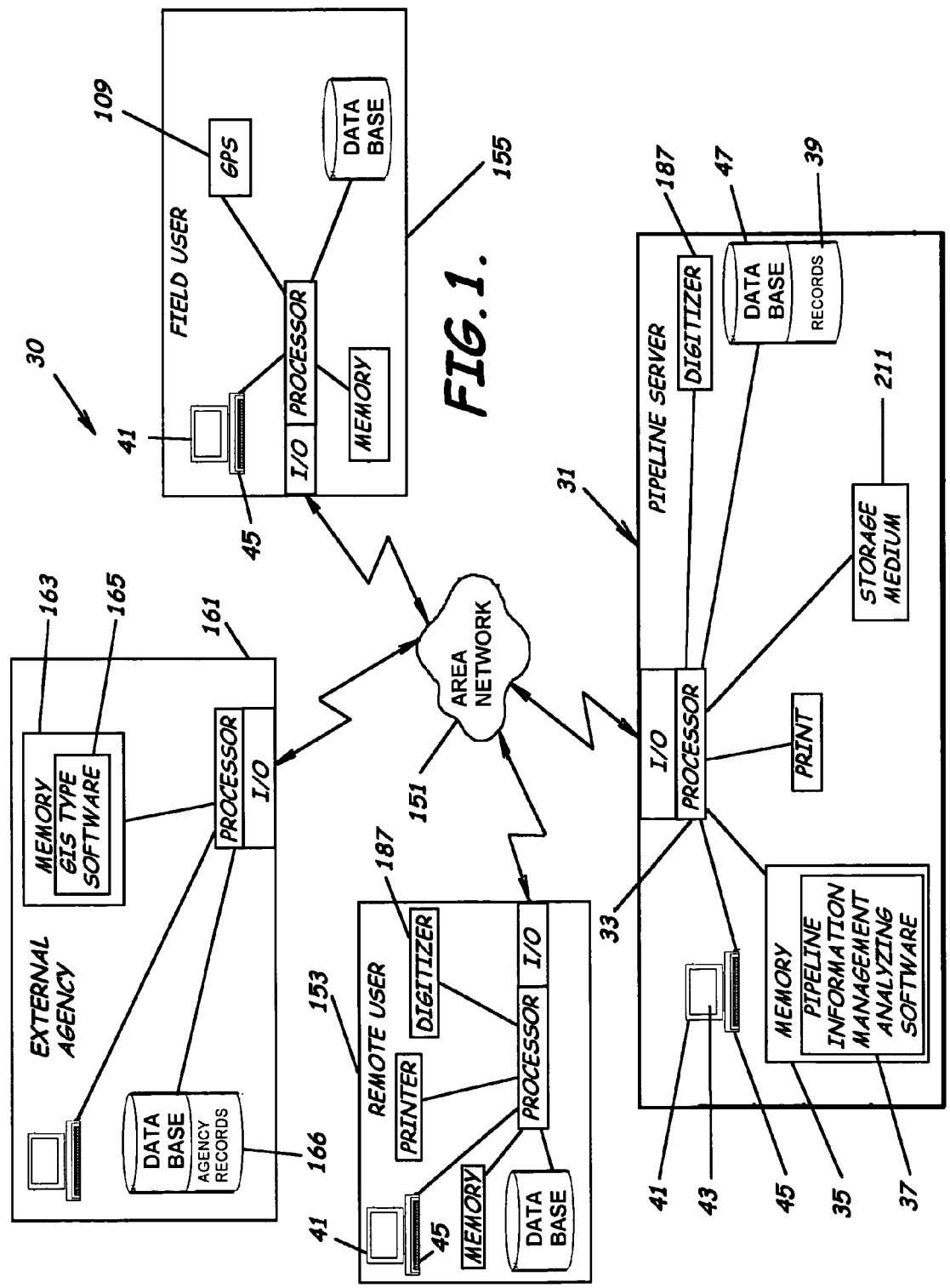
FIG. 1 is a schematic diagram of a system to facilitate pipeline management according to an embodiment of the present invention.
Figure 2:
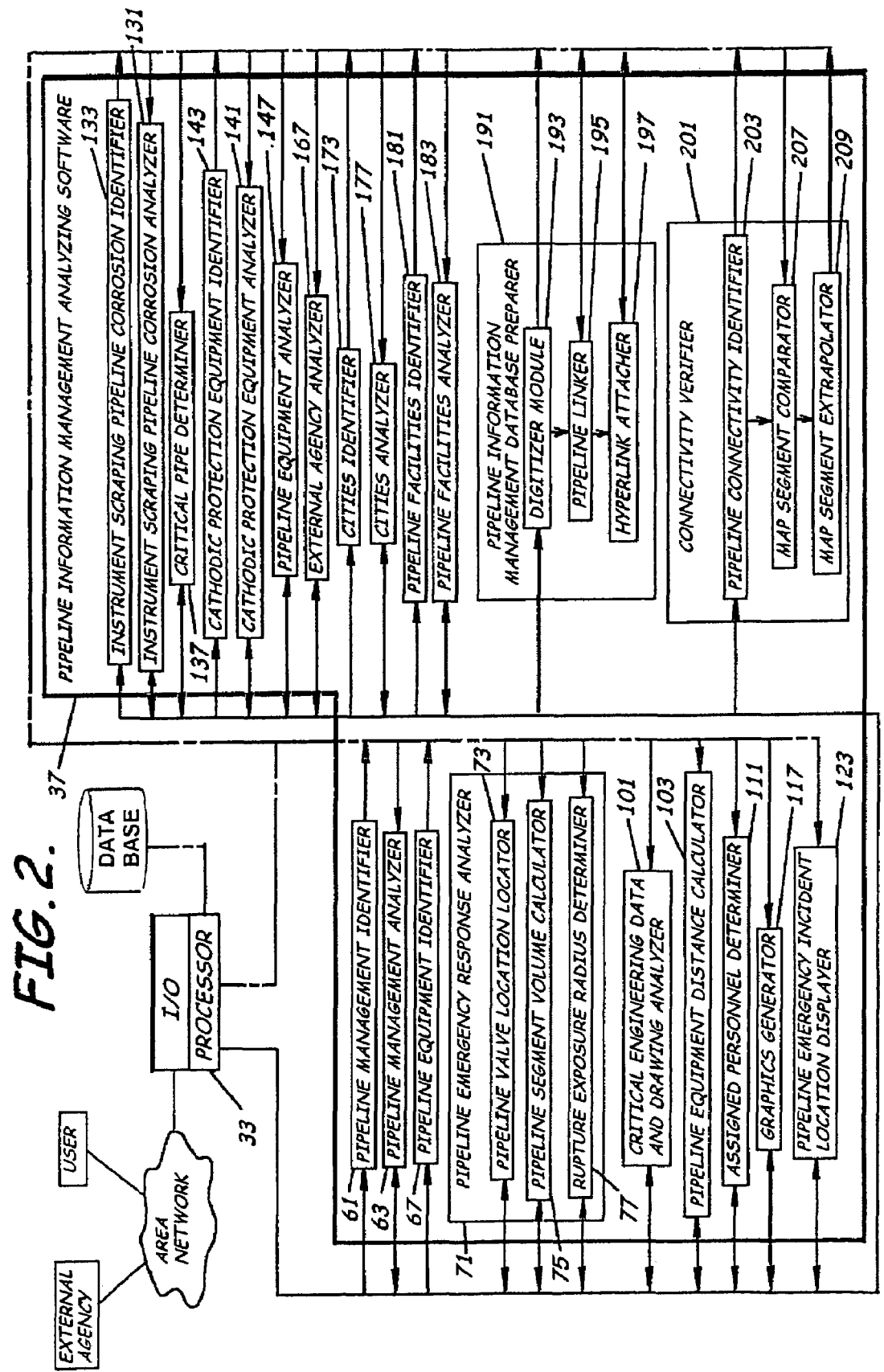
FIG. 2 is a schematic diagram of software to facilitate pipeline management according to an embodiment of the present invention.
Figure 3:
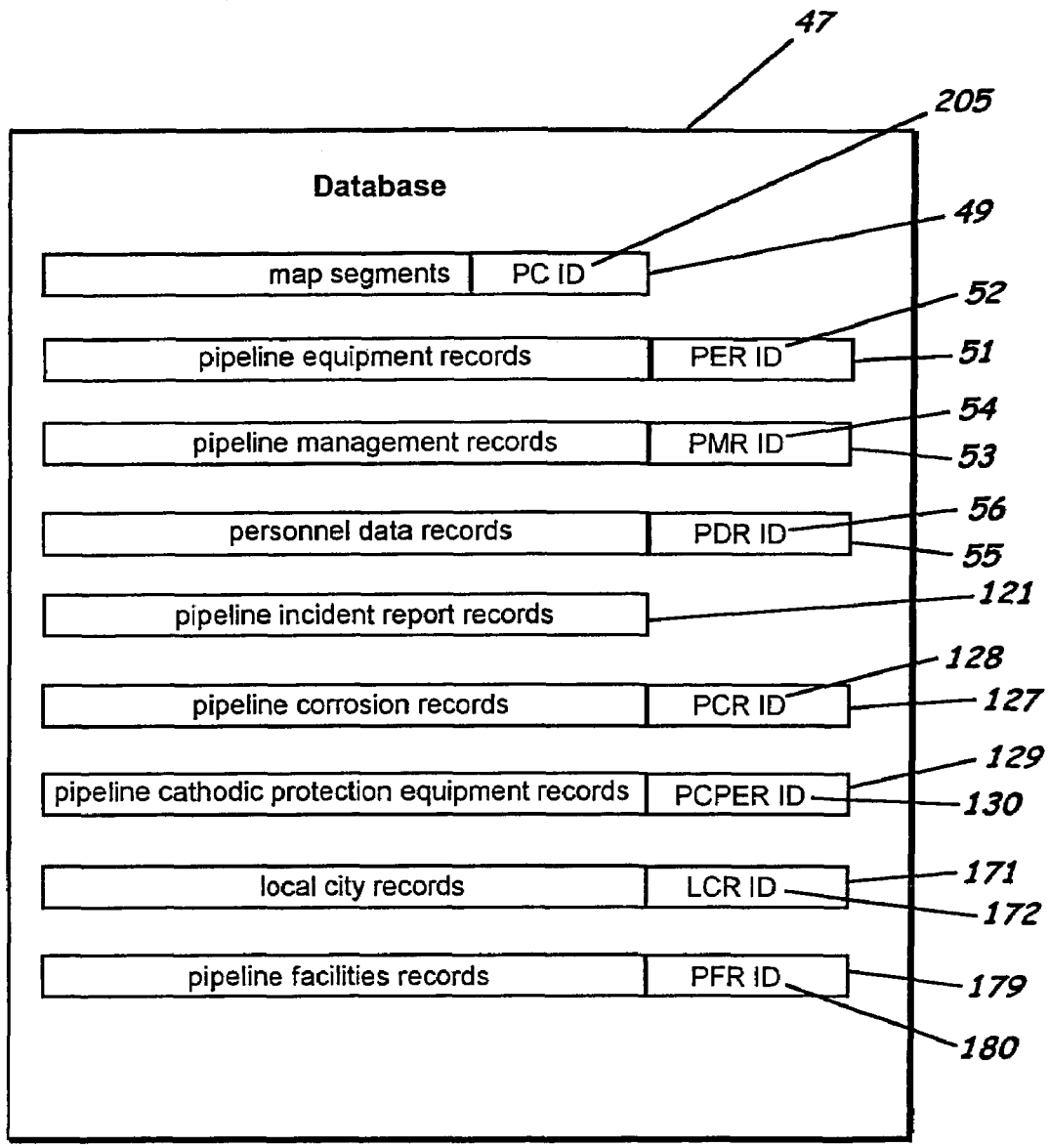
FIG. 3 is a schematic diagram of a database accessed by software according to FIG. 2 to facilitate pipeline management according to an embodiment of the present invention.

As illustrated in FIGS. 1-17, embodiments of the present invention advantageously provide a system, software, and methods for facilitating pipeline management. Perhaps as best shown in FIG. 1, the system 30 includes a first pipeline company computer positioned at a pipeline company site to define a pipeline company server 31. The server has a processor 33 and memory 35 coupled to the processor 33 to store software 37 and database records 39. A graphical display 41 is coupled to the processor 33 for displaying graphical images 43, and a user interface 45 coupled to the processor 33 to provide a user access to manipulate the software 37 and database records 39. The system 30 further includes a database 47 or combination of databases stored in the memory of the pipeline company server 31. As best shown in FIG. 3, the database 47 or combination databases include a plurality of map segments 49 obtained from geographic sources such as a map, a processed satellite image, or an aerial photograph. The database 47 or databases further include at least a plurality of pipeline equipment records 51 having at least engineering data, drawings, and location data of pipeline equipment, a plurality of pipeline management records 53 including pipeline equipment management data, and a plurality of personnel data records 55 functionally linked to either a pipeline operational area or a specific pipeline. As shown in FIGS. 1 and 2, the system 30 further includes pipeline information management analyzing software 37 stored in memory 35 of the server 31 to analyze pipeline management requirements. The pipeline information management analyzing software 37 is positioned to interface with a user and will generally allow the user to inquire about any pipeline asset or pipeline equipment by either name or location.

As shown in FIGS. 1-3, in an embodiment of the present invention, the software 37 can include a pipeline management identifier 61 positioned to tag a pipeline management record 53 in the database 47 with a pipeline management record identifier 54, e.g. a numeric, alphanumeric, or other code as understood by those skilled in the art. The software 37 can also include a pipeline management analyzer 63 positioned to retrieve the pipeline management record 53 by the pipeline management record identifier 54 from the database 47 and is responsive to a user selecting pipeline equipment 65 (FIG. 10) through the user interface to display the pipeline management record 53 to the user to thereby assist the user in planning and execution of management actions on the user selected pipeline equipment 65. The user, for example, can select a piece of pipeline or other pipeline equipment 65 and display maintenance records or scheduled maintenance or repairs, current status, or other important piece of documentation necessary to the user to properly manage the pipeline asset. Correspondingly, the user can update the pipeline management record 53 to provide a second user the latest information regarding the pipeline asset. The software 37 also can include a pipeline equipment identifier 67 positioned to tag a pipeline equipment record 51 in the database 47 with a pipeline equipment record identifier 52. The use of an identifier is one methodology of access to various records in a database, however, other methodologies as known by those skilled in the art are within the scope of the present invention.

The pipeline information management analyzing software 37 includes a pipeline emergency response analyzer 71 to analyze a pipeline emergency. The pipeline emergency response analyzer 71 has at least a pipeline valve location locator 73 positioned to retrieve a plurality of pipeline equipment records 51 having pipeline valve location data by their respective pipeline equipment record identifier 52 from the database 47. Also shown in FIG. 11, the pipeline valve location locator 73 is responsive to a geographic reference point 81 entered by a user through the user interface 45 which represents a location of the pipeline emergency, to identify at least one immediate upstream valve 83 and at least one immediate downstream valve 85 from the location of the pipeline emergency. Identification of valves located upstream and downstream of an emergency is an important feature because it identifies valves which must be closed 87 in order to isolate a leaking or ruptured pipeline. Also shown in FIG. 12, the valves identified by the pipeline valve location locator 73 should include both in-line pipeline valves and non-in-line pipeline valves, all of which may require being closed in order to properly isolate the leak or rupture. Preferably, the geographic reference point 81 can be either the pipeline name and kilometer location of the pipeline emergency referenced to the pipeline starting point (not shown) or a geographic coordinate. The data returned to the user, should not only include the pipeline valves requiring to be closed 87 to isolate the leak or rupture, but should also include other data such as the pipeline name 89, pipeline kilometer location 91 of the leak or rupture, geographic coordinates 93, and operational area 95 the leaking or ruptured pipeline is associated with.

In an embodiment of the present invention, the pipeline emergency response analyzer 71 also has a pipeline segment volume calculator 75 responsive to the pipeline valve location locator 73 to determine the identity of the immediate upstream and downstream valves 83, 85. The pipeline segment volume calculator 75 calculates an amount of pipeline segment volume inventory between the upstream and downstream valves 83, 85, to determine or estimate potential lost inventory from a pipeline leak or rupture. Knowledge of which valves need closing and correspondingly the type of pipeline equipment the valves are associated with is generally required in order to properly perform a calculation of the potential volume of production fluid, gas, or Natural Gas Liquid (NGL), or other gaseous or liquid fluids contained within the pipeline and any pipeline segments bounded by the valves required to be closed. Additionally, knowledge of the potential amount of lost inventory or product is a significant feature because it not only provides for the determination of an economic loss but also provides an early forecast of the potential environmental impact of the leak or rupture.

Figure 13:
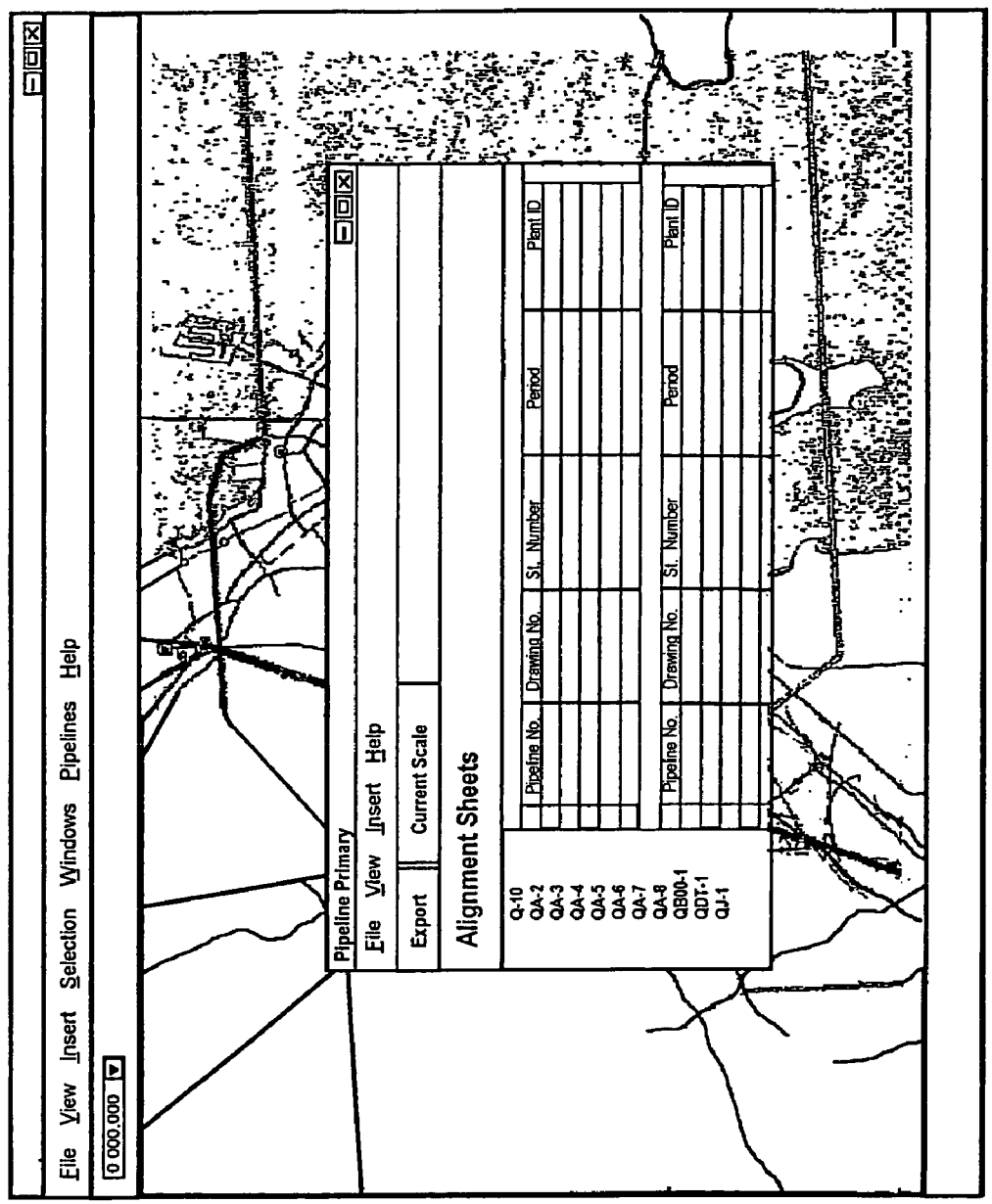
FIG. 13 is a schematic diagram of a GUI depicting a menu window displaying selectable pipeline engineering drawings according to an embodiment of the present invention.

The pipeline information management analyzing software 37 further includes a critical engineering data and drawings analyzer 101 positioned to retrieve a pipeline equipment record 51 containing critical engineering data and drawings from the database 47 and is responsive to the user selecting a piece of pipeline equipment 65, such as a pipeline or a pipeline valve, through the user interface 45 to display critical engineering data and drawings for the user selected pipeline equipment 65 (FIG. 13). The critical engineering data and drawings contained in the pipeline equipment record 51 can include but are not limited to Valve Operating Diagrams, Safety Instruction Sheets and Process and Instrument Diagrams. The critical engineering data and drawings not only provide information helpful to prosecuting a pipeline emergency but also provide a manager user the ability to plan for contingency emergency operations and critical or priority maintenance. The critical engineering data and drawings may also include jump-over areas and pipeline corridor aerial photoplans along with low-level photography of jump-over areas which are overlaid with vectors to give the photographs the potential for adding hyperlink links (described later) as well as giving technical information in the geographic context of the photographs.

Figure 14:
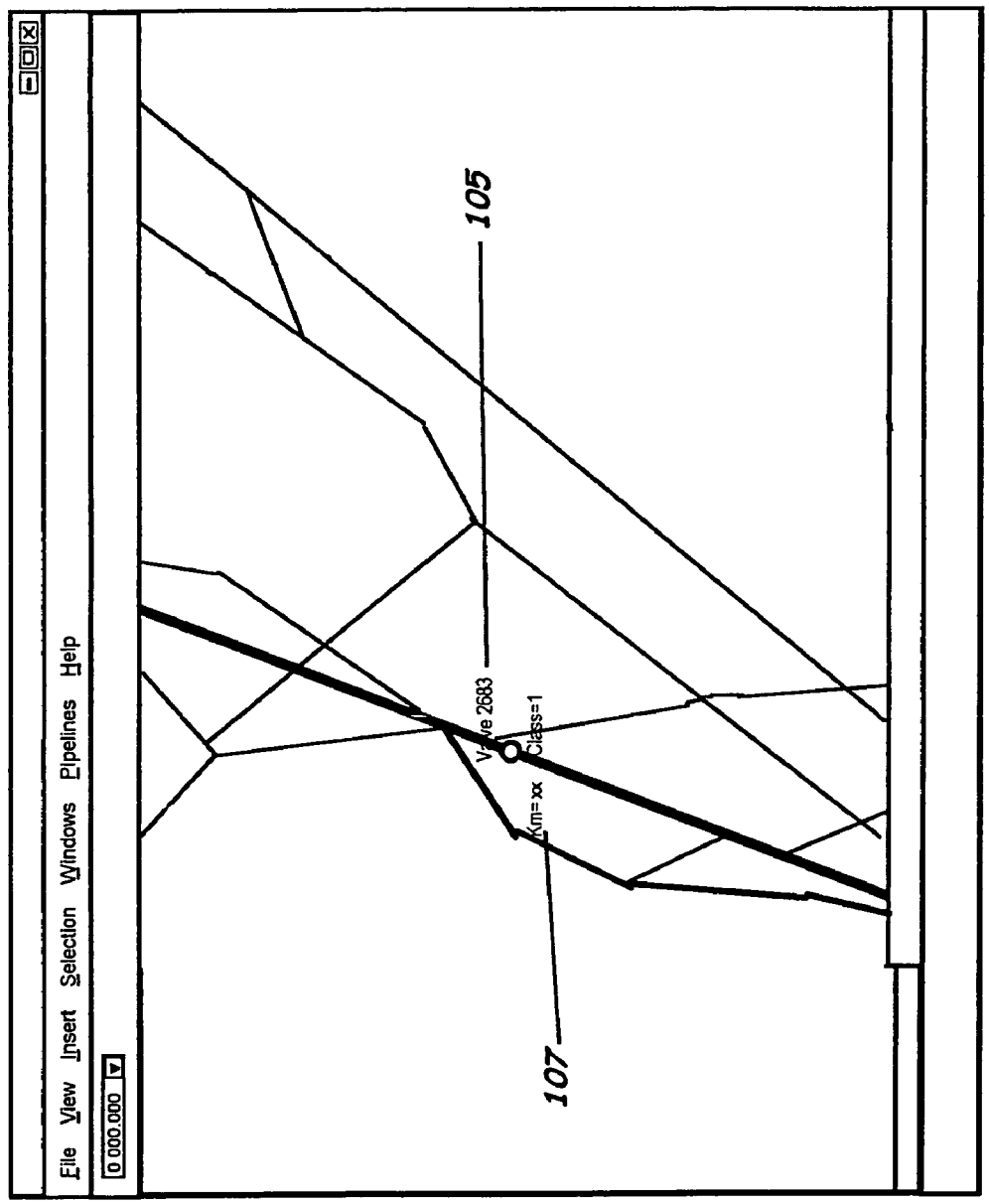
FIG. 14 is a schematic diagram of a GUI depicting a window displaying the distance calculation for a pipeline equipment according to an embodiment of the present invention.

As shown primarily in FIG. 2, advantageously, in an embodiment of the present invention, the pipeline information management analyzing software 37 includes a pipeline equipment distance calculator 103 positioned to retrieve a pipeline equipment record 51 containing pipeline equipment location data from the database 47 and is responsive to the user selecting an individual piece of pipeline equipment 65 such as a valve 105 (FIG. 14) through the user interface 45 to display distance measurements 107 of the selected pipeline equipment 65 from a pipeline reference point (not shown) such as, for example, the pipeline starting point. The pipeline reference point can be either a distance measurement from the beginning of a named pipeline as shown in FIG. 14 or the actual geographic coordinates. This provides a user the ability to determine travel time required to reach a destination work area associated with the pipeline equipment 65. Thus, the user manager is provided the ability to factor travel time along with the estimated time to complete the destination work area task, leading to more effective management, specifically time management, of pipeline personnel. Additionally, if the user is equipped with equipment such as a portable global positioning system (GPS) or Loran receiver 109 (FIG. 1), geographic coordinates would provide the user with a direct distance and vector to the work area or the ability to plot a course using various waypoints coinciding with positions such as road intersections in order to more accurately determine the exact vehicular distance, route, and estimated time of arrival at the work area based on a given departure time.

Figure 15:
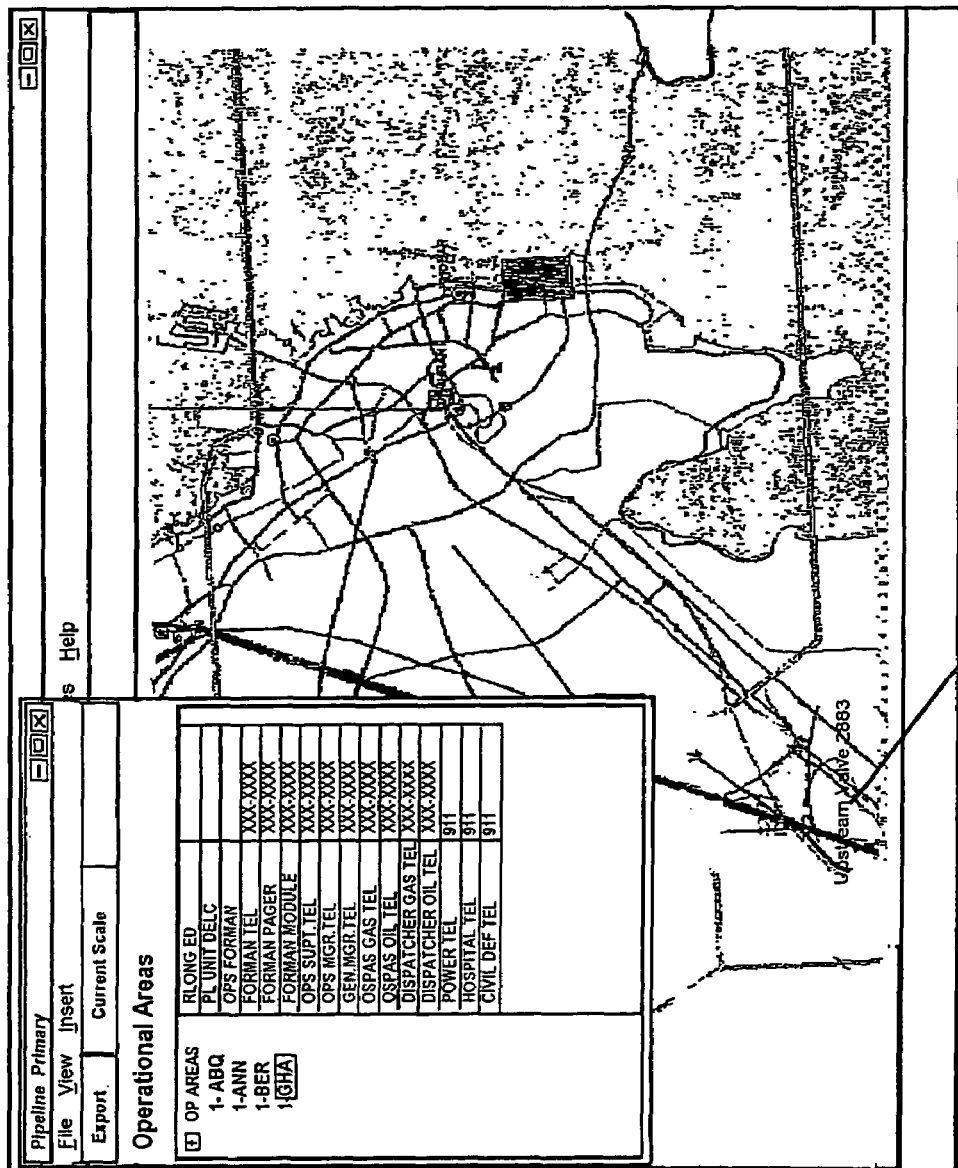
FIG. 15 is a schematic diagram of a GUI depicting a menu window displaying a selectable operational area for displaying contact personnel assigned to the selected area according to an embodiment of the present invention.

The pipeline information management analyzing software 37 also includes an assigned personnel determiner 111 positioned to retrieve from the database 47 assigned personnel data preferably in the form of a personnel data record 55 containing pipeline equipment assignment information. Also as shown in FIG. 15, the assigned personnel determiner 111 is responsive to the user, through the user interface 45, selecting a geographic indicator such as a piece of pipeline equipment 65 selected from a menu, a window, a hyperlink (described later), or a pipeline operational area 113 to display contact personnel assigned primary responsibility for the user selected pipeline equipment 65 or pipeline operational area 113. Personnel are typically assigned to either an operational area 113 or to pipeline equipment 65, such as a named pipeline or pipeline component such as a valve, however, personnel can be assigned and therefore extracted by other means as known by those skilled in the art and still be within the scope of the present invention.

Figure 11:
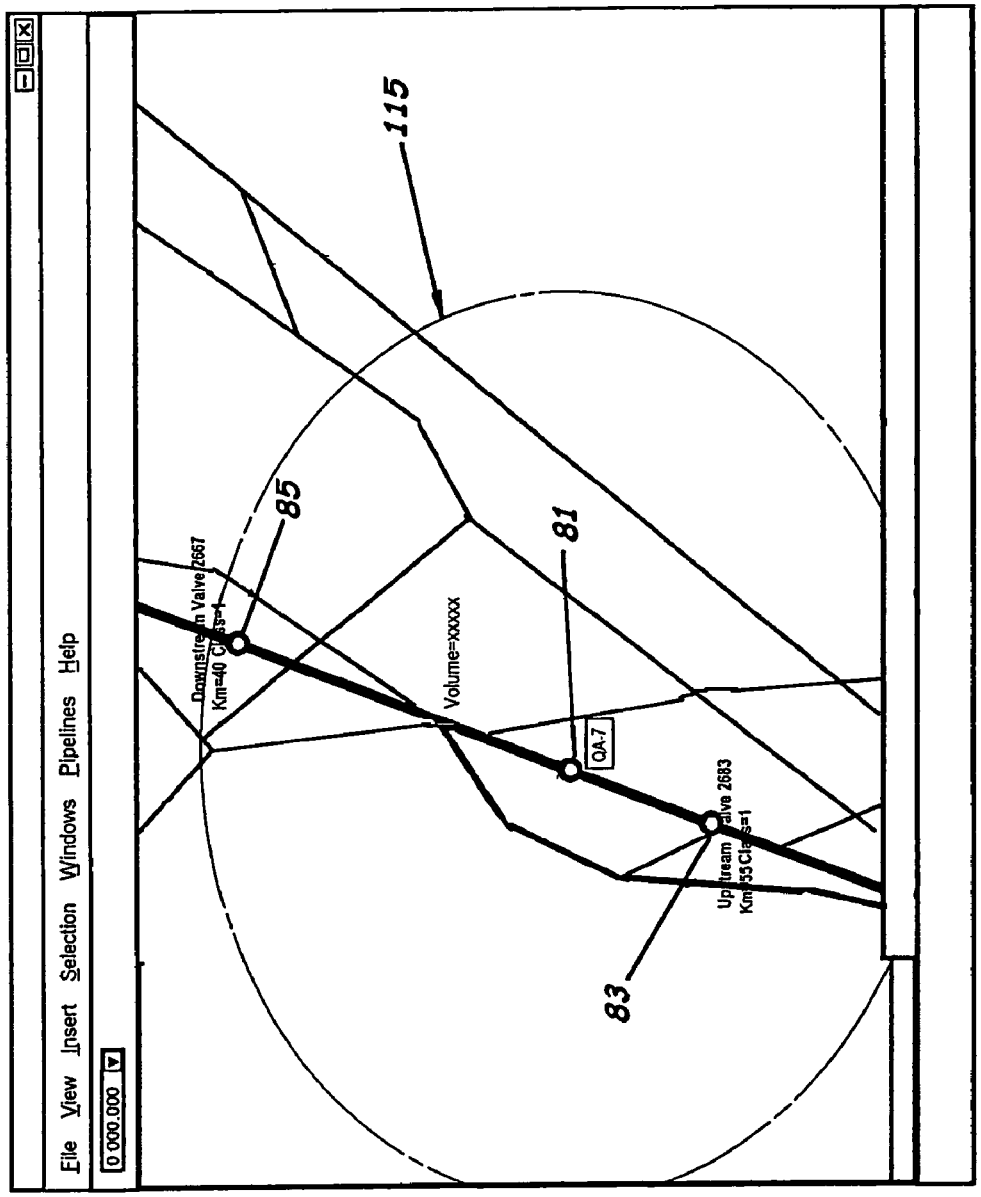
FIG. 11 is a schematic diagram of a GUI depicting up-stream/down-stream valves and segment volume inventory between the valves within a pipeline according to an embodiment of the present invention.

As shown primarily in FIGS. 2 and 3, advantageously, in another embodiment of the present invention, the pipeline emergency response analyzer 71 of the pipeline information management analyzing software 37 further includes a rupture exposure radius determiner 77 positioned to retrieve at least one map segment 49 and at least one pipeline equipment record 51 from the database 47 and is responsive to a geographic reference point 81 entered by a user through the user interface 45 representing a location of the pipeline rupture to identify a rupture exposure radius coverage area 115 of a pipeline (FIG. 11) and to provide summary information about pipeline equipment 65 within the rupture exposure radius coverage area 115 (FIG. 11). The size of the rupture exposure radius coverage area 115 is mainly determined by a preset buffer zone boundary distance setting and other factors such as types of product transported in the pipelines.

The pipeline information management analyzing software 37 also includes a graphics generator 117 positioned to retrieve at least one of the plurality of map segments 49 from the database 47 and at least one of the plurality of pipeline equipment records 51 from the database 47 and is responsive to a geographic reference point 81 entered by a user through the user interface 45 to display, on the graphical display 41, a graphical representation of the map segments 49 and the pipeline equipment 65 or subset thereof. The geographic reference point 81 can be supplied by any means known by those skilled in the art such as, for example, entering the geographic reference point 81 into a text box (not shown) of the graphical display 41 or through a user selectable hyperlink (described later) attached to a pipeline equipment 65 and displayed on or overlaid upon the at least one of the plurality of map segments 49 from the database 47. Advantageously, once the map segments 49 are overlapped by pipeline equipment 65, the user can zoom-in to a point of interest such as a rupture location, specific section of pipeline, or individual piece of pipeline equipment 65. Advantageously, the user can "fetch" data on an individual piece of pipeline equipment 65 or other structure of interest to the user.

Figure 16:
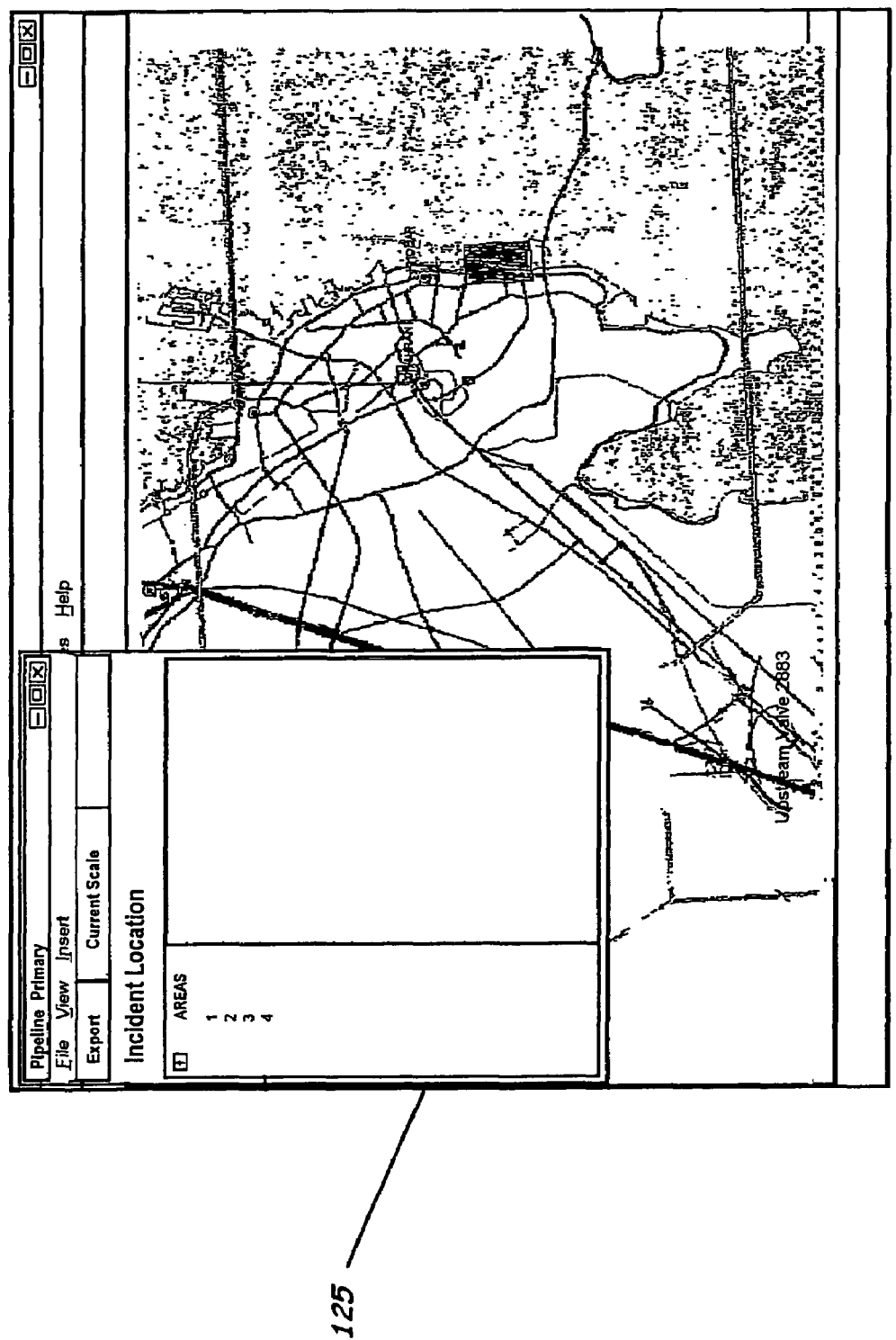
FIG. 16 is a schematic diagram of a GUI depicting a menu window displaying a selectable pipeline incident report list for displaying a specific pipeline incident report according to an embodiment of the present invention.
Figure 17:
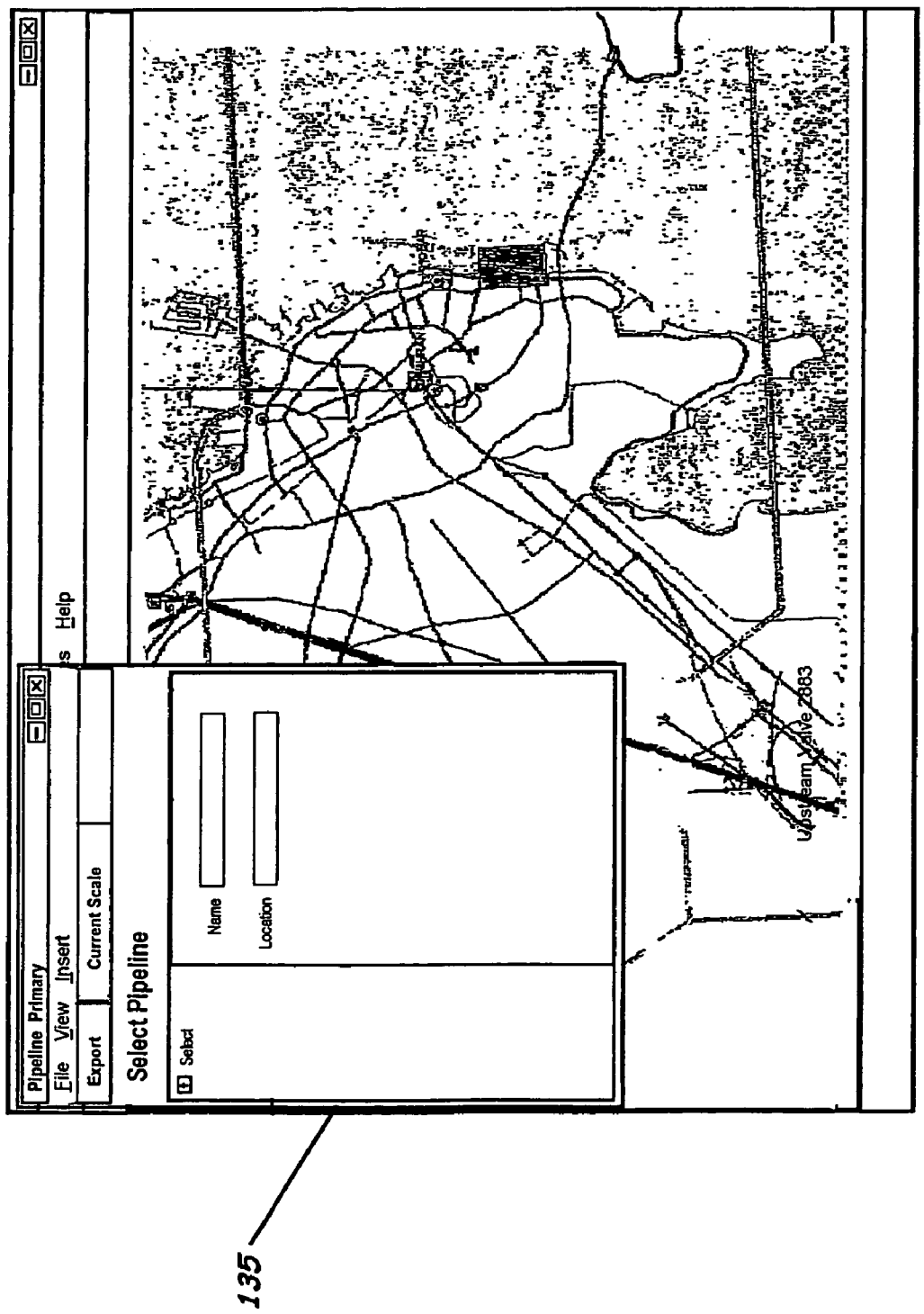
FIG. 17 is a schematic diagram of a GUI depicting a generic menu window displaying a selectable pipeline list for displaying various pipeline data sheets according to an embodiment of the present invention.

As shown in FIGS. 2 and 3, the database can include a plurality of pipeline incident report records 121. A pipeline incident report record 121 which generally contains summary information about a pipeline rupture or other incident can be entered by a user through the user interface 45 to be stored in the database 47. The pipeline information management analyzing software 37 further includes a pipeline emergency incident location displayer 123 positioned to retrieve a pipeline incident report record 121 from the database 47 and is responsive to a user request through the user interface 45 to display an incident location 125 or locations (FIG. 16). The user can then select an incident location 125 and cause the software 37 to display the data contained within the incident report record 121 for the selected incident location 125.

In an embodiment of the present invention, the database 47 can further include a plurality of pipeline corrosion records 127 and a plurality of pipeline cathodic protection equipment records 129. In this embodiment, the pipeline information management system analyzing software 37 further includes an instrument scraping pipeline corrosion analyzer 131 positioned to retrieve at least one of the plurality of pipeline corrosion records 127 from the database 47, typically by a pipeline corrosion records identifier 128 stored with the pipeline corrosion records 127, although, as with all records in the database 47, other selection criteria as known by those skilled in the art is within the scope of the invention. The pipeline corrosion records identifier 128, if used, is placed by an instrument scraping pipeline corrosion identifier 133 positioned to tag the pipeline corrosion record 127 entered by a user through the user interface 45.

The instrument scraping pipeline corrosion analyzer 131 is responsive to the user selecting a pipeline 135 (FIG. 17) through the user interface 45 to display instrument scraping pipeline corrosion data to assist the user in planning and execution of repairs to the user selected pipeline 135. The instrument scraping data can be obtained by various methodologies as known and understood by those skilled in the art. In one methodology, for example, the instrument scraping tool is a sensor (not shown) having an exciter coil and a sensor coil that is sent through a pipeline to electronically detect deviations in the pipeline casing and which has a means as known by those skilled in the art to record a geographic reference point of any deviation detected. This data is then provided to the pipeline management system 30 typically through use of a pipeline corrosion record 127 which can be recalled for analysis in determining prioritization of repair work on a pipeline. The user is provided the ability to then map geographically the corrosion indications measured by the instrument scraping tool. The pipeline information management analyzing a software 37 can also include a critical pipe determiner 137 positioned to retrieve pipeline equipment records 51 from the database 47 and responsive to a user selecting a pipeline 135 (FIG. 17) through the user interface 45 to display critical (non-scrapeable) pipe associated with the user selected pipeline 135.

The pipeline information management system analyzing software 37 also includes a cathodic protection equipment analyzer 141 positioned to retrieve at least one of the plurality of cathodic protection equipment records 129 from the database 47, preferably by a cathodic protection records identifier 130 stored with the cathodic protection equipment record 129. The pipeline cathodic protection equipment records identifier 130, if used, is placed by a cathodic protection equipment identifier 143 positioned to tag the pipeline cathodic protection equipment record 129 entered by a user through the user interface 45. The cathodic protection equipment analyzer 141 is responsive to the user selecting a pipeline 135 (FIG. 17) through the user interface 45 to display cathodic protection equipment data to assist the user in planning and implementation of cathodic protection resources to the user selected pipeline. This feature is advantageous because cathodic protection has probably become the most widely used method of preventing corrosion deterioration of metallic pipelines. Cathodic protection reduces the corrosion rate of a metallic pipeline by reducing its corrosion potential typically by providing an anode or an impressed current across the pipeline being protected. The cathodic protection data is either entered by the user or remotely sent via any available communication media (wire or wireless) in the form of a cathodic protection equipment record 129. Some of the most significant features of the cathodic protection data include the type and location of the anodes or impressed current terminals, depending on the selected methodology.

The pipeline information management system analyzing software 37 can include a pipeline equipment analyzer 147 responsive to a user selecting a piece of pipeline equipment 65 through the user interface 45 to display pipeline equipment inspection, operation, and maintenance data stored in at least one of the plurality of pipeline management records 53 in the database 47 to assist in planning and execution of repairs to the user selected pipeline equipment 65. This feature provides an improved methodology of tracking and managing operations and maintenance on specific pieces of pipeline equipment or for the entire pipeline system.

Figure 12:
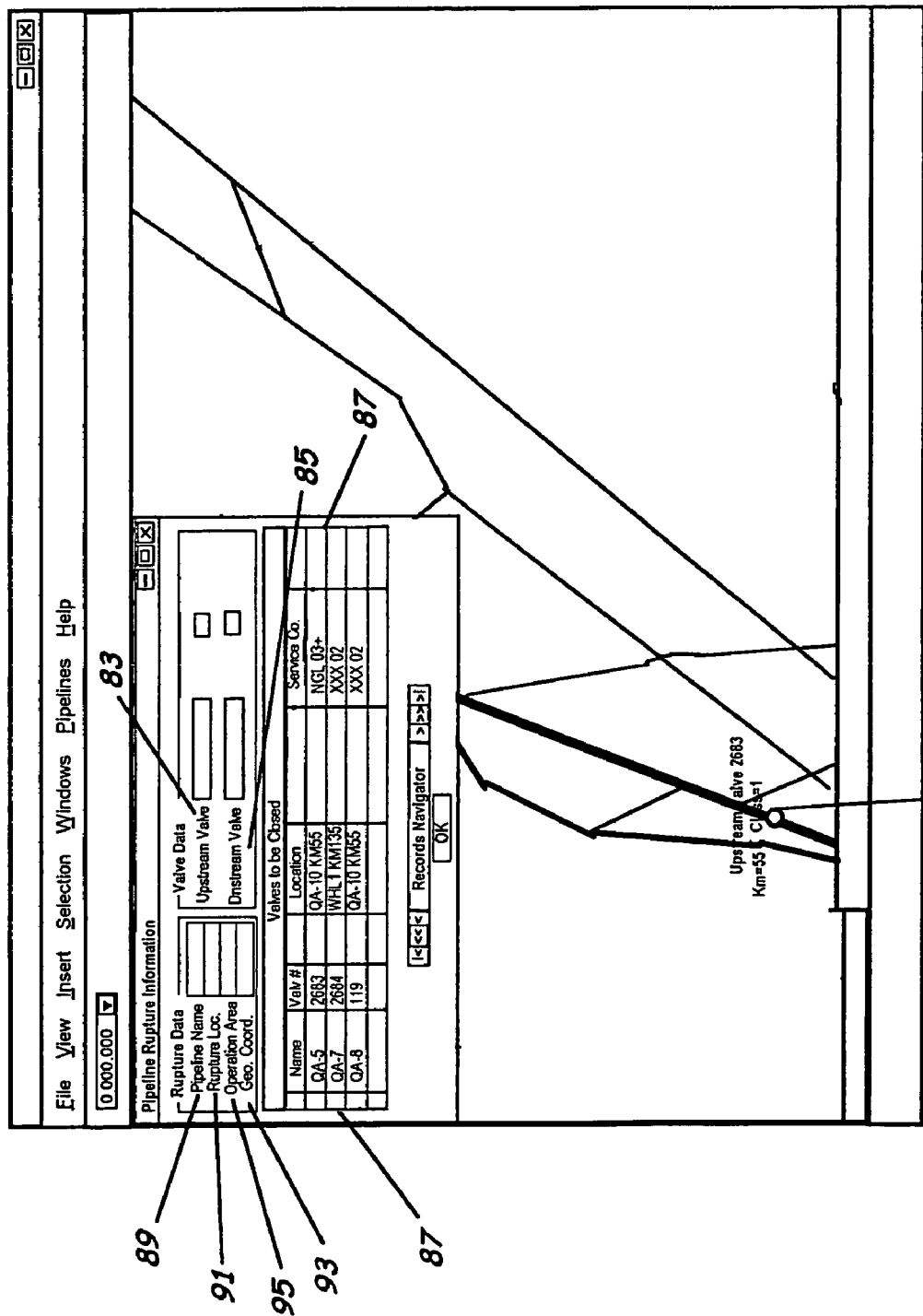
FIG. 12 is a schematic diagram of a GUI depicting a list of valves to be closed during a pipeline emergency according to an embodiment of the present invention.

Functionally, the user can query the database 47 for pipeline equipment 65 which will access, alone or in combination, the functions of the pipeline management analyzer 63 and the pipeline equipment analyzer 147. For example, if a pipeline database query is selected, the query can return data or a form containing data related to an alignment sheet (FIG. 13), such as drawing number, starts and points of each pipeline's drawing segment, along with other data. This query can also show a list of valves attached to the selected pipeline. The list can typically include details such as valve number, valve type, size, pressure rating, and manufacturer. The list can show expanded data on those valves if the valves were specifically highlighted such as where the pipeline emergency response analyzer 71 located or flagged the valves as those required to be closed (FIG. 12). This query can also provide access to data related to critical pipe such as the critical-pipe name, category, pipeline generic location, SIS sheet number, initial hydro-test date, and revalidation test date. This query can also provide various pipeline sketches, inspection data, pipeline instruments data, and prime-mover data for the selected pipeline. Additionally, information related to gas/liquid meters, personnel contact information typically based on operational area, pipeline segments, road crossings, scrapeable segments, scraper traps, and surge relief skids can be displayed.

In an embodiment of the present invention, the system 30 includes an area network 151 in communication with the server 31, and a remote user computer 153 in communication with the area network 151, positioned remote from the server 31 at a user site, and positioned to access the pipeline information management analyzing software 37. When in communication with the server 31 through the area network 151, the remote user computer 153 can access the pipeline information management system analyzing software 37 to transmit or upload data such as geographic data or pipeline equipment data. The remote user computer 153 can retrieve records 39 from the server database 47 such as map segments 49, pipeline equipment records 51, and pipeline management records 53 for display and user manipulation. Though the user, in most embodiments, can directly access the server 31, the preferred methodology provides user managers the ability to access the described pipeline information management analyzing software 37 through use of strategically located remote terminals or computers 153.

The system 30 can also include a portable user computer 155 adapted to interface with the area network 151, positioned remote from the server 31 at a user site, and adapted to retrieve a plurality of map segments 49, pipeline equipment records 51, and pipeline management records 53 from the database 47 to provide a remote user with necessary data and reference material to operate and maintain specific pipeline equipment 65 while at a remote site associated with the pipeline equipment 65. Advantageously, the portable user computer 155 can display a pipeline equipment work location associated with pipeline equipment 65 and is preferably adapted to transmit, through the area network 151, updated information to the server 31, such as an updated pipeline management record 53 to be stored in the database 47 to reflect pipeline equipment work accomplished on the pipeline equipment 65 associated with the pipeline equipment work location or an updated pipeline equipment record 51 reflecting a change of status to a piece of pipeline equipment 65. Preferably the portable computer 155 is also interfaced with a GPS unit 109 or a separate GPS unit is carried in order to provide such features as a preferred means of locating a work area, locating pipeline assets to work on, and to provide precise geographic coordinates of the work performed or pipeline equipment 65 affected by a status change, just to name a few. The pipeline equipment data and the geographic coordinates related to the data can be superimposed and linked to enable a user to recall the information based on geographic coordinates.

The system 30 can further include an external agency computer 161 positioned at a external agency site, in communication with the pipeline company server 31 through the area network 151, having memory 163 associated therewith, and having geographic information system-based software 165 stored in the memory 163. The external agency computer software 165 is positioned to locate emergency services such as nearby external agencies. The pipeline information management system analyzing software 37 correspondingly further includes an external agency analyzer 167 in communication with the external agency geographic information system-based software 165 through the area network 151 and is responsive to a user selecting a geographical reference point such as the location of a piece of pipeline equipment 65 or a predetermined operational area 113 associated with a piece of pipeline equipment 65, through the user interface 45, to display nearby external agencies to the user. This allows the user to locate a nearby external agency to provide support in the event of a pipeline or personnel emergency.

In an embodiment of the present invention, the database 47 can also further include a plurality of local city records 171. Correspondingly, the pipeline information management analyzing software 37 further includes a cities identifier 173 positioned to tag a local city record 171 in the database 47 with a city record identifier 172. A cities analyzer 177 is positioned to retrieve the local city record 171 from the database by the city record identifier 172, if used, or other methodology as known by those skilled in the art. The cities analyzer 177 is responsive to a user selecting a pipeline 135 (FIG. 17) through the user interface 45 to display at least one local city to the user. This feature allows or assists the user in identifying at least one city near the user selected pipeline in order for the user to ascertain additional resources available during repair or maintenance operations and to ascertain environmental impact on the local populace during a pipeline emergency.

In this embodiment, the database 47 can further include a plurality of pipeline facilities records 179. Correspondingly, the pipeline information management analyzing software 37 can further include a pipeline facilities identifier 181 and a pipeline facilities analyzer 183. The pipeline facilities identifier 181, if included, is positioned to tag a pipeline facilities record 179 in the database 47 with a pipeline facilities record identifier 180. The pipeline facilities analyzer 183 is positioned to retrieve the pipeline facilities record 179 from the database 47 either by the pipeline facilities record identifier 180 or other methodology known by those skilled in the art. The pipeline facilities analyzer 183 is responsive to a user selecting a pipeline 135 (FIG. 17) through the user interface 45 to display at least one pipeline facilities record 179 to the user to thereby assist the user in identifying at least one pipeline facility near the user selected pipeline 135.

In another embodiment, the pipeline management system 30 includes satellite imagery analysis software (not shown) stored in memory 35 of the server 31, positioned to receive map segments 49 from the database 47 including a pipeline vector, and positioned to receive a map segments 49 from a processed satellite image associated with a discrete geographic area from the user through the digitizer 187 (FIG. 1) to compare the processed satellite image to remotely obtain a status of a pipeline and other associated pipeline equipment to provide for control of the pipeline and other associated pipeline equipment by displaying time dependent geographic variations of the pipeline and other associated pipeline equipment.

Operationally, the database 47 cannot always be purchased and updated by an external source. Internal development of the database 47 may be necessary. As shown primarily in FIGS. 1-3, in an embodiment of the present invention, the pipeline management system 30 includes the capability of loading map segments 49 into the database 47. In this embodiment, the system 30 includes a digitizer 187 positioned to receive a plurality of map segments 49 corresponding to pipeline equipment location data entered by a user from a map, processed satellite image, or aerial photograph, and digitized by the digitizer 187. In this embodiment, the pipeline information management analyzing software 37 includes a pipeline information management database preparer 191 to prepare the database 47 to provide the functionalities and features described above. The database preparer 191 can be either a module of the pipeline information management analyzing software 37 as described above or a stand-alone software package independent of the pipeline information management analyzing software 37. The database preparer 191 includes a digitizer module 193 positioned to receive from the digitizer 187 map segments 49 entered by the user and positioned to store the map segments 49 in the database 47 to enable the user to display geographic images 43 related to pipeline equipment 65. The database preparer 191 preferably also includes a pipeline linker 195 responsive to a geographic reference point 81 representing a geographic location of pipeline equipment 65 provided or selected by the user and entered through the user interface 45. The pipeline linker 195 is positioned to retrieve map segments 49 in the database 47 and pipeline equipment records 51 from the database 47 to link the user provided or selected geographic location of the pipeline equipment 65 to geographic data of the map segment 49 for storage in the database 47 or for immediate display on the graphical display 41. The database preparer 191 also preferably includes a hyperlink attacher 197 positioned to retrieve map segments 49 in the database 47 and pipeline equipment records 51 and is responsive to the link formed by the pipeline linker 195 to add a user selectable hyperlink to a map segment 49 to select the pipeline equipment records 51 to be displayed on the graphical display device 41 to provide graphical user selection of the pipeline equipment 65. The pipeline linker 195 and hyperlink attacher 197 of the database preparer 191 can preferably be implemented either to link a pipeline equipment record 51 with the map segment 49 upon first entry of the map segment 49 or pipeline equipment record 51 to the database 47, or can be implemented to access all map segments 49 and pipeline equipment records 51 or a subset thereof and link pipeline equipment records 51 with all map segments 49, or a subset thereof, corresponding to the geographic coordinates of the pipeline equipment 65, or can be implemented to link a subset of the plurality of pipeline equipment records 51 to a subset of map segments 49 based on other selected functional features of the software such as the implementation of the rupture exposure radius determiner 77. In an alternative embodiment of the present invention in the pipeline linker 195 and hyperlink attacher 197 are directly part of the pipeline information management software 37 and can function to add links and hyperlinks upon software 37 initialization or upon selection of either a map segment 49 or a geographic feature related to the map segment 49 such as a piece of pipeline equipment 65.

In another embodiment of the present invention, the pipeline management system 30 can include a connectivity verifier 201 positioned to retrieve map segments 49 from the database 47 and responsive to a user inputting into the database 47 a new map segment 49 either having a named pipeline vector as part of the map segment 49 or the named pipeline vector otherwise related to a map segment 49, verify connectivity of the new named pipeline vector between itself and the existing plurality of map segments 49 in the database 47 to form a single vector line for each named pipeline between the plurality of map segments 49 stored in the database 47 and the new pipeline vector. The connectivity verifier 201 can be a stand-alone software or a module of the pipeline information management analyzing software 37. The connectivity verifier preferably includes a pipeline connectivity identifier 203 positioned to tag a named pipeline vector entered by a user through the user interface 45 with a pipeline connection identifier (not shown) for assignment to at least one of the plurality of map segments 49 in the database 47 containing the named pipeline vector. The connectivity verifier 201 also includes a map segment comparator 207 positioned to retrieve each map segment 49 in the database adjacent the new map segment 49 having the same named pipeline vector to compare each map segment 49 adjacent the new map segment 49 having the same named pipeline vector to verify at least one pipeline vector map segment endpoint of the new map segment is aligned geographically with an end point of at least one adjacent map segment having the same named pipeline vector. The connectivity verifier 201 further includes a map segment extrapolator 209 responsive to the map segment comparator 207 to extrapolate a geographic alignment of the at least one end point of the named pipeline vector of the new map segment 49 with the at least one named pipeline vector end point of the adjacent map segment 49 identified by the map segment comparator 207 to have at least one pipeline vector map segment endpoint that is not aligned geographically with the corresponding pipeline vector map segment endpoint of the new map segment 49.

An embodiment of the present invention also advantageously provides pipeline information management analyzing software 37 stored on a storage media 211 to analyze pipeline management requirements. The software 37 includes a pipeline emergency response analyzer 71 to analyze a pipeline emergency. The pipeline emergency response analyzer 71 has a pipeline valve location locator 73 adapted to retrieve a plurality of pipeline equipment records 51 having pipeline valve location data from the database 47 and adapted to respond to a geographic reference point 81 entered by a user through the user interface 45. The geographic reference point 81 represents a location of the pipeline emergency and is used to identify at least one immediate upstream valve 83 and at least one immediate downstream valve 85 from the location of the pipeline emergency. The valves identified by the pipeline valve location locator 73 are preferably both in-line valve and a non-in-line valves. The valve identification is made to determine which valves should be closed in order to isolate a leak or rupture.

Advantageously, the pipeline information management analyzing software 37 also includes a critical engineering data and drawings analyzer 101 adapted to retrieve from the database 47 a pipeline equipment record 51 containing critical engineering data and drawings and adapted to respond to the user selecting a piece of pipeline equipment 65 through the user interface 45 to display critical engineering data and drawings for the user selected pipeline equipment 65. The critical engineering data, datasheets, and drawings benefit not only the user manager during the decision phase of a pipeline emergency, but also during routine management operations such as the selection of priority pipeline equipment 65 requiring additional inspection or maintenance, along with contingency planning or potential emergency forecasting.

Advantageously, the pipeline emergency response analyzer 71 of the software 37 can further include a pipeline segment volume calculator 75 responsive to the valve determinations made by the pipeline valve location locator 73 and is adapted to calculate an amount of pipeline segment volume inventory between the at least one upstream valve and the at least one downstream valve 83, 85, to thereby determine potential lost inventory from the pipeline leak or rupture and aid in the determination of a projected environmental impact caused by the leak or rupture. The emergency response analyzer 71 can also include a rupture exposure radius determiner 77 adapted to retrieve from the database 47 of map segments 49 and pipeline equipment records 51 and is adapted to respond to a geographic reference point 81 entered by a user through the user interface 45 representing a location of the pipeline rupture. Advantageously, by setting a buffer zone radius, the user can identify a rupture exposure radius coverage area 115 of a pipeline 135 and receive summary information about pipeline equipment 65 within the rupture exposure radius coverage area 115.

The pipeline information management analyzing software 37 can also include a pipeline equipment distance calculator 103 adapted to retrieve from the database 47 a pipeline equipment record 51 containing pipeline equipment location data and is adapted to respond to a user selecting a pipeline equipment 65 through the user interface to display distance measurements 107 of the selected pipeline equipment 65 from a pipeline reference point such as a pipeline starting point. This is primarily accomplished to determine travel time required to reach a destination work area associated with a piece of pipeline equipment 65, but also to improve personnel asset management.

Advantageously, the pipeline information management analyzing software 37 can also include an assigned personnel determiner 111 adapted to retrieve from the database 47 a personnel data record 55 containing pipeline equipment and operational area assignment information. The assigned personnel determiner 111 is adapted to respond to a user, through the user interface 45, by selecting a geographic reference 81 associated with pipeline equipment 65 such as a location of a piece of pipeline equipment 65 or a pipeline operational area 113 associated with a piece of pipeline equipment 65, to display contact personnel assigned primary responsibility for the user selected geographic reference 81.

The pipeline information management analyzing software 37 further includes a pipeline emergency incident location displayer 123 adapted to retrieve from the database 47 a pipeline incident report record 121 and is adapted to respond to a user request through the user interface to display at least one incident location 125. The emergency incident location displayer 123 is adapted to respond to a user selecting at least one incident location 125 to display an incident report record 121 for the displayed incident location selected by the user. This feature provides the user the ability to recall previous incidents and geographically spatially track the location of prior incidents to examine trends and to ascertain weaknesses in the various pipelines 135 of the pipeline system.

The pipeline information management system analyzing software 30 can further include an external agency analyzer 167 adapted to communicate with an external agency computer 161 through an area network 151 and is adapted to respond to a user selecting a pipeline 135 or other pipeline equipment 65 through the user interface 45 to access and display external agency records 166 (FIG. 1) to the user to locate a nearby external agency to provide support in the event of a pipeline emergency.

The pipeline information management analyzing software 37 can further include a pipeline management analyzer 63 adapted to retrieve from the database 47 a pipeline management record 53 and adapted to respond to a user selecting a piece of a pipeline 135 or other pipeline equipment 65 through a user interface to display the pipeline management record to the user to thereby assist the user in planning and execution of management actions on the user selected pipeline 135 or other pipeline equipment 65. The user, for example, can select a piece of pipeline 135 or other pipeline equipment 65 and display maintenance records or scheduled maintenance or repairs, current status, or other important piece of documentation necessary to user to properly manage the pipeline asset. Correspondingly, the user can update the pipeline management record 53 to provide a second user the latest information regarding the pipeline asset.

The pipeline information management analyzing software 37 further includes a graphics generator 117 adapted to retrieve from the database 47 map segments 49 and pipeline equipment records 51, is adapted to respond to a geographic reference point 81 entered by a user through the user interface 45, and is adapted to interface with a graphical display 41 to display a graphical representation 43 of map segments 49 and pipeline equipment 65 on the graphical display 41. The geographic reference point 81 supplied by the user through the user interface 45 and utilized by the graphics generator 117 is supplied or provided through various methodologies as known by those skilled in the art to include use of a geographic map coordinate entered in a text box of the graphical display and a user selectable hyperlink attached to a piece of pipeline equipment 65 originating from the database 47 and displayed on the graphical display 41 overlapping the map segment 49 displayed by the graphics generator 117.

The pipeline information management system analyzing software 37 can include an instrument scraping pipeline corrosion analyzer 131 adapted to retrieve pipeline corrosion records 127 from the database 47 and is adapted to respond to a user selecting a pipeline 135 through the user interface 45 to display instrument scraping pipeline corrosion data extracted from the pipeline corrosion records 127. The instrument scraping corrosion data can assist the user manager in planning and execution of repairs to the user selected pipeline 135. The pipeline information management analyzing software 37 also includes a cathodic protection equipment analyzer 141 adapted to retrieve from the database 47 cathodic protection equipment records 129 and is adapted to respond to a user selecting the pipeline 135 through the user interface 45 to display cathodic protection equipment data extracted from the cathodic protection equipment records 129. The cathodic protection equipment data can assist the user manager in planning and implementation of cathodic protection resources to the user selected pipeline 135.

The pipeline information management analyzing software 37 can also include a cities analyzer 177 adapted to retrieve from the database 47 local city records 171 and is adapted to respond to a user selecting a pipeline 135 or other pipeline equipment 65 through the user interface to display at least one local city location record 171 to the user. This feature assists the user in identifying at least one city near the user selected pipeline 135 or other pipeline equipment 65 for reasons such as determining environmental impact on nearby citizens for determining the closeness of facilities necessary to pipeline management. The pipeline information management analyzing software 37 can further include a pipeline facilities analyzer 183 adapted to retrieve from the database 47 a pipeline facilities record 179 and is adapted to respond to a user selecting a pipeline 135 or other pipeline equipment 65 through the user interface to display at least one pipeline facilities record 179 to the user. This feature assists the user in identifying at least one pipeline facility near the user selected pipeline 135 or other pipeline equipment 65 also for reasons such as determining environmental impact on nearby citizens for determining the closeness of facilities necessary to pipeline management.

Figure 4:
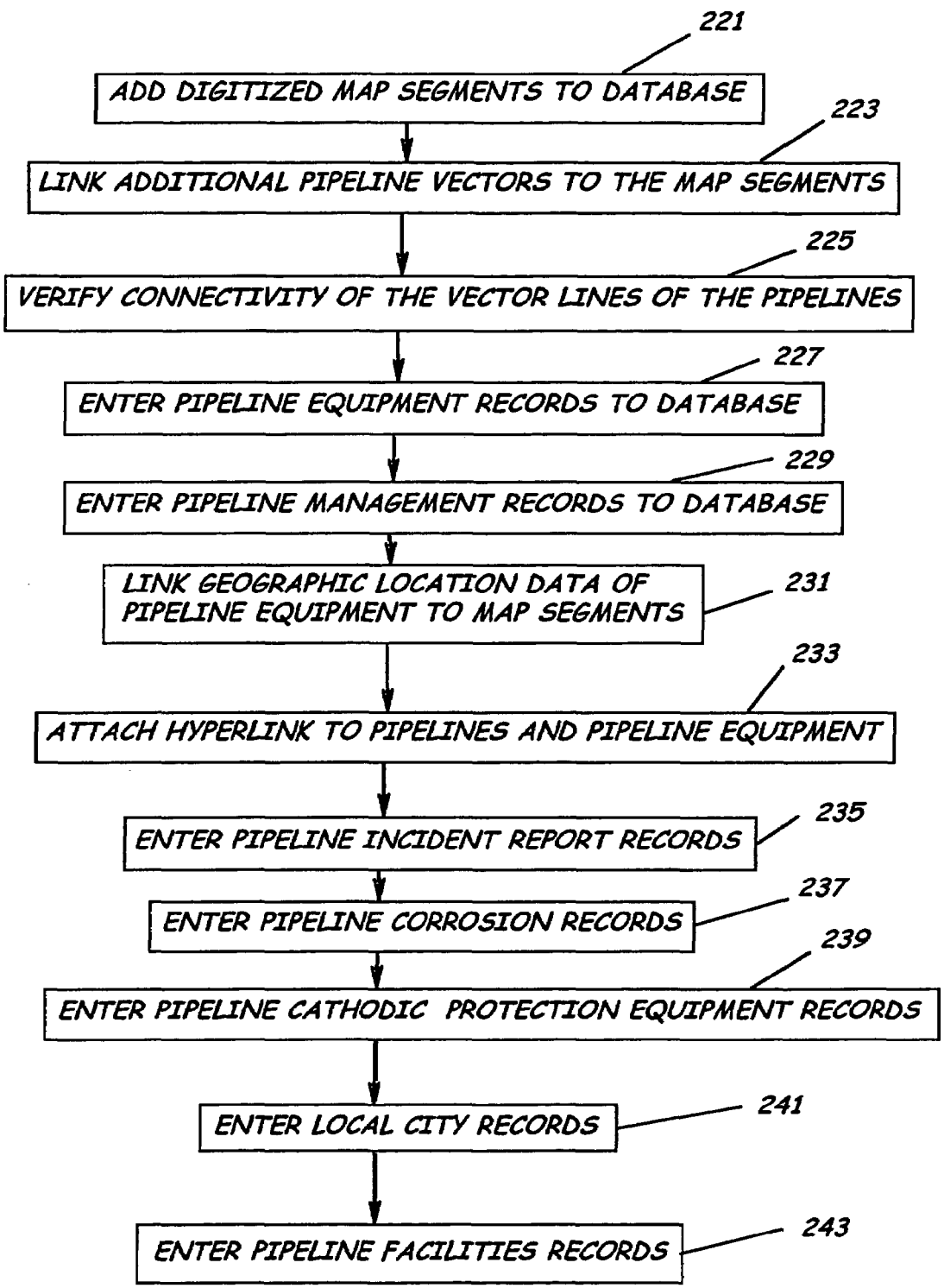
FIG. 4 is a flowchart of a method of preparing a database for facilitating pipeline management according to an embodiment of the present invention.

Advantageously, an embodiment of the present invention also provides a method of preparing a database or combination of databases for facilitating pipeline management. This is an important feature whether or not a database or combination of databases already contains map segments of the pipeline geographic environment. As shown in FIG. 4, the method includes the steps of forming a plurality of digitized map segments 49 (block 221) defining at least one of a map, a processed satellite image, and an aerial photograph for storage in a database 47 to provide for the display of a geographical relationship between terrain featured in the map segments 49 and a pipeline network. This is generally accomplished through use of a digitizer 187 such as a scanner. Generally, after the database 47 contains map segments 49 comprising the pipeline geographic environment, additional pipeline vectors can be added and relationally linked (block 223) to each map segment 49 having geographic boundaries corresponding to the geographic boundaries of the pipeline vector to verify the connectivity of the vector lines of the pipelines (block 225). A user can either form a plurality of pipeline equipment records 51 or access existing pipeline records 51 for storage in the database 47 (block 227) which include at least engineering data, drawings, and location data of pipeline equipment 65 to provide for detailed engineering analysis on the pipeline equipment 65. The method also includes forming or accessing a plurality of pipeline management records 53 (block 229) including pipeline equipment management data for storage in the database 47 to provide for planning and execution of management actions on the pipeline equipment 65. The geographic location data of the pipeline equipment 65 can then be linked to the map segments 49 (block 231). A hyperlink can be created to relate a geographic reference point 81 or vector on the map segments 49 to pipeline equipment 65 (block 233) as defined in the pipeline equipment records 51. Additional records 39 can be added depending upon the various embodiments implemented by the user. An embodiment of the present invention includes the addition of any pipeline incident report records 121 (block 235), pipeline corrosion records 127 (block 237), pipeline cathodic protection equipment records 129 (block 239), local city records 171 (block 241), and pipeline facilities records 179 (block 243).

Figure 5A:
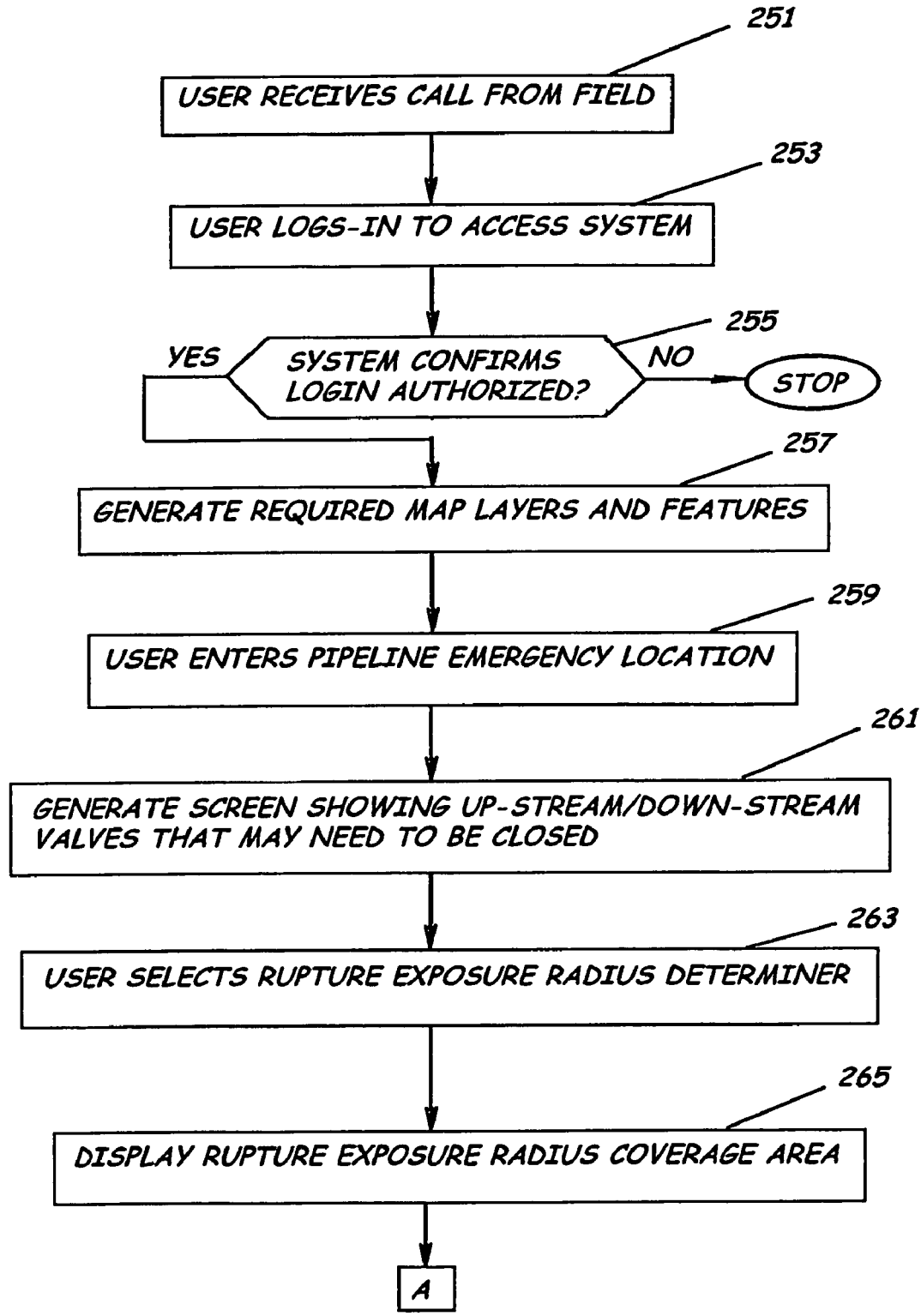
FIG. 5A-C is a flowchart of a method for facilitating pipeline management during an emergency operation according to an embodiment of the present invention.
Figure 5B:
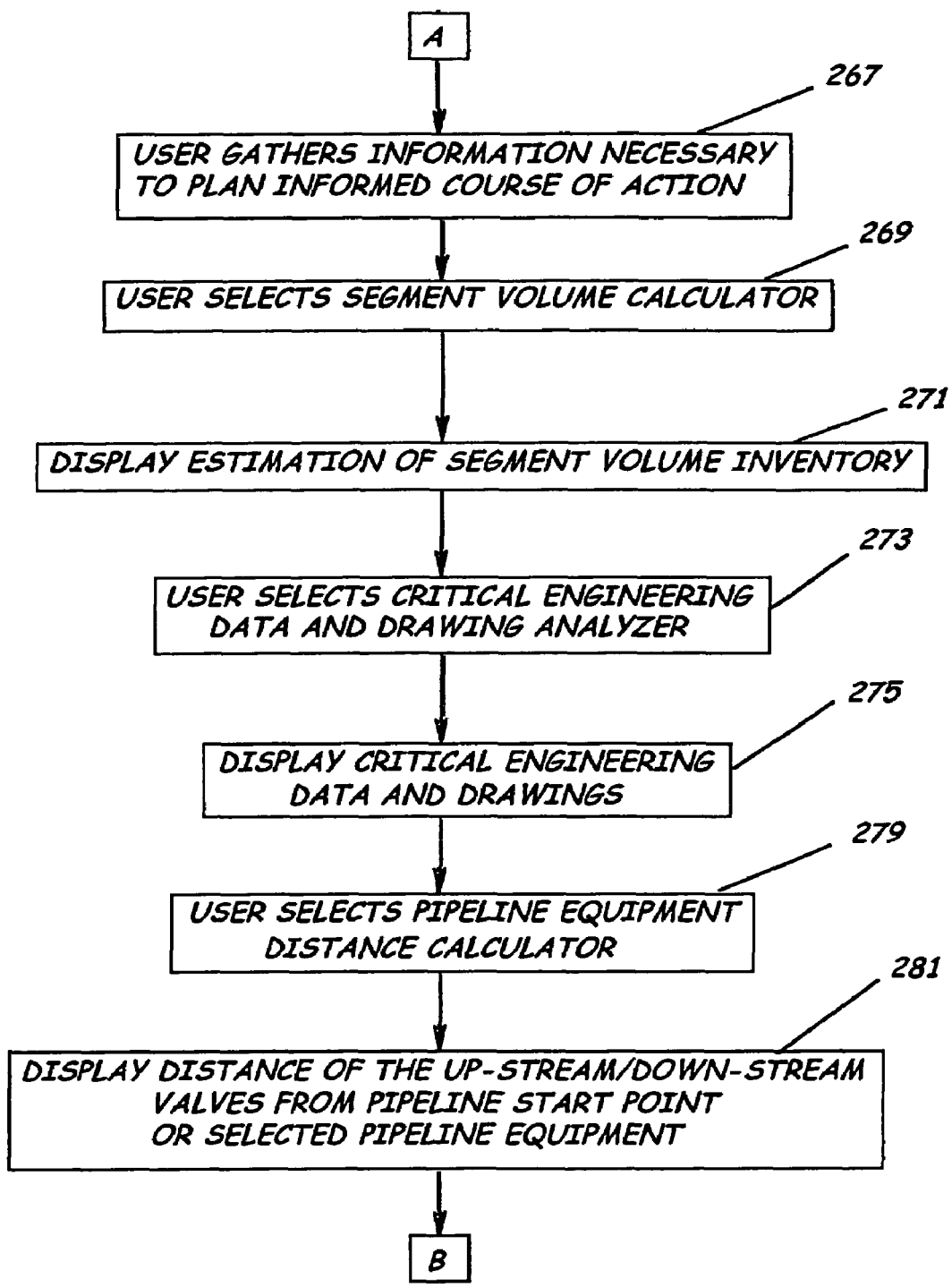
Figure 5C:
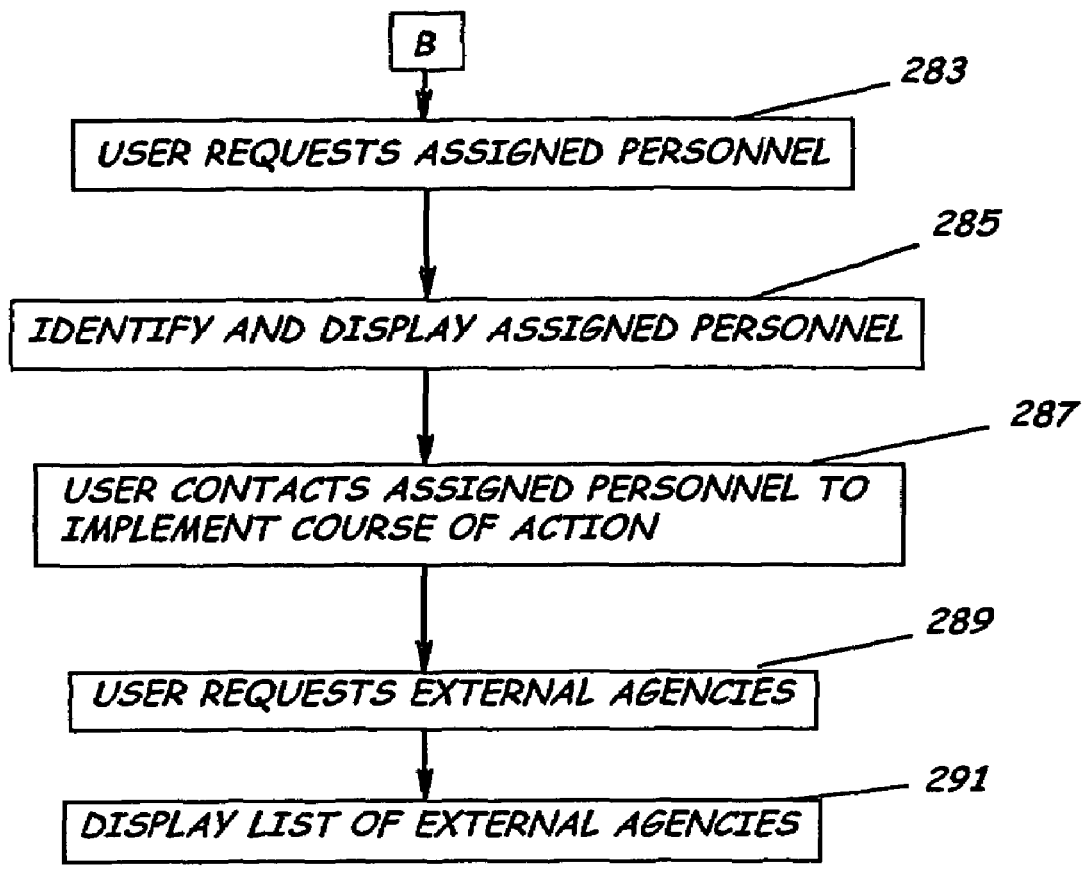
Figure 10:
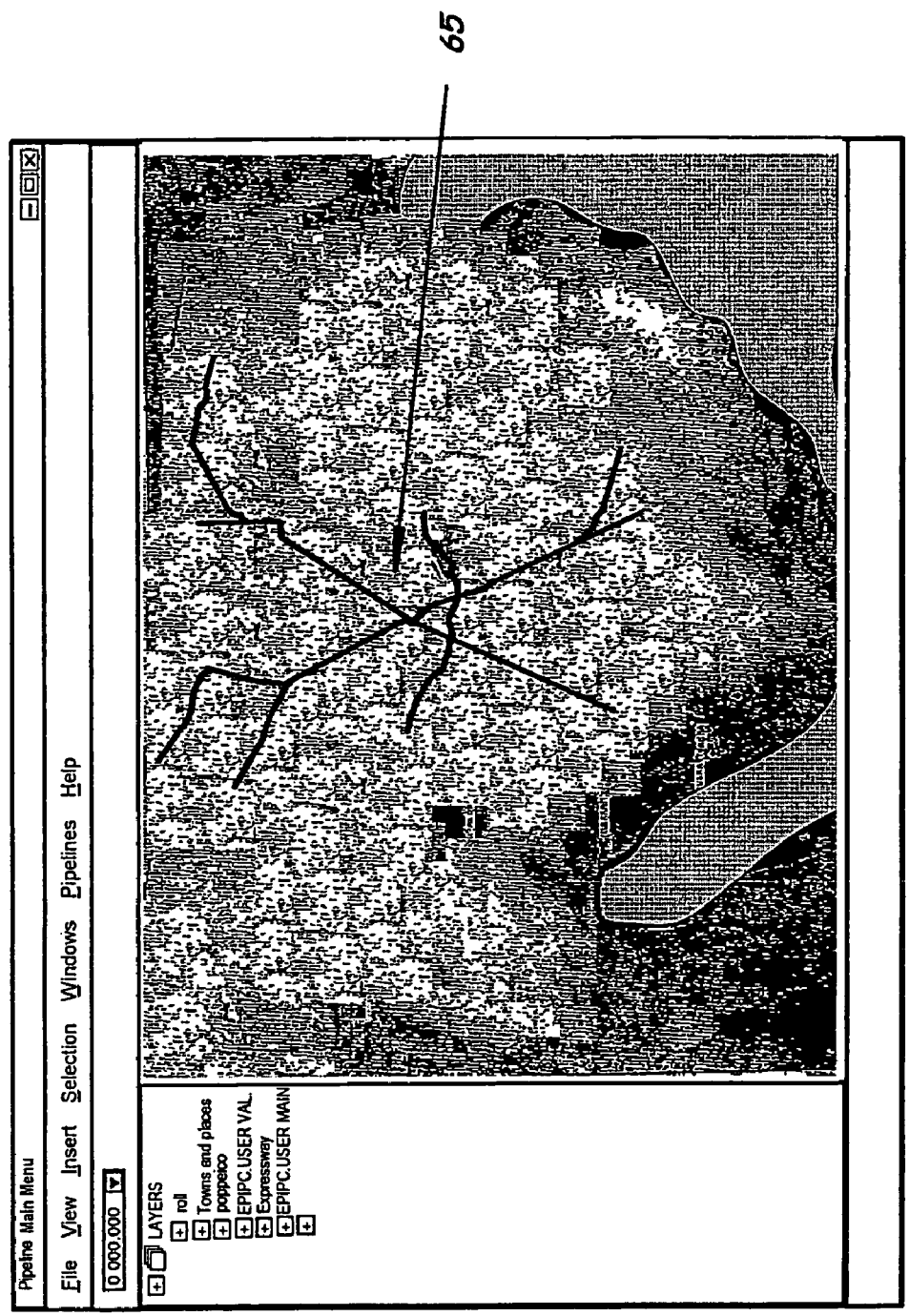
FIG. 10 is a schematic diagram of a graphical user interface ("GUI") depicting a main menu page of a system to facilitate pipeline management according to an embodiment of the present invention.

Advantageously, an embodiment of the present invention also provides a method for analyzing a pipeline emergency operation such as a pipeline problem/defect including a pipeline rupture. As shown in FIGS. 5A-C, the emergency action is generally initiated by a leak detection system or a user such as a manager receiving a phone call from the field (block 251). The user then logs-in to access the pipeline information management analyzing software 31 (block 253). A secure entry screener module confirms through the login that the user is authorized access (block 255). Also as shown in FIG. 10, if the user is authorized, the software 37 generates required map layers and features (block 257) and displays the main menu. The user can now enter the pipeline emergency geographic location (block 259). In an embodiment, this is accomplished either by entering a geographic coordinate or the pipeline name and kilometer area location. Also shown in FIG. 11, the software then identifies immediate upstream and downstream valves 83, 85, from the location of the pipeline problem (block 261) to thereby identify pipeline valves potentially needing to be closed, especially where a rupture is involved. Also shown in FIG. 12, the software 37 can also identify sub-valves that also may need to be closed. In the preferred configuration, the user can select through the user interface 45 a rupture exposure radius determiner (block 263) to request the software 37 to display (block 265) a rupture exposure radius coverage area 115 of the problematic pipeline to thereby identify an area that is or would be affected by a pipeline rupture and to obtain summary information about pipeline equipment 65 located within the rupture exposure radius coverage area 115.

The user can proceed to gather information necessary to plan an informed course of action (block 267). Although implementation of the steps required to gather the necessary information will be discussed with respect to a specific order, there is no particular set order of extracting information from the pipeline information management analyzing software 37. As best shown in FIGS. 5B-C, follows is a subset of steps that may be implemented to gather the necessary information to plan the informed course of action. The user can select through the user interface 45 a segment volume calculator 75 (block 269) to request the software 37 to display (block 271) an estimation of the amount of segment volume inventory (FIG. 11) between the immediate upstream and downstream valves 83, 85. The segment volume inventory estimation provides the user the ability to determine potential lost inventory where the problem is a pipeline leak or rupture and allows the user to forecast the potential environmental impact which may be caused by the leak or rupture. Note, in most embodiments or configurations, the only action the user need take to select the segment volume calculator 75 is to initiate use of the pipeline emergency response analyzer 71.

Preferably the user can select (block 273) and the software 37 can display (block 275) critical engineering data and drawings (FIG. 13) to provide the user with critical information about the affected pipeline. Additionally, the user can select through the user interface 45 an equipment distance calculator 103 (block 279) to request the software 37 to display (block 281) the distance to various pieces of pipeline equipment 65 such as the up-stream and downstream valves 83, 85, either by geometric coordinates, geographic vector and distance, or with reference to a reference point such as the pipeline start point for the pipeline associated with the selected pipeline equipment 65. This provides the user the ability to determine the length of time for pipeline personnel to reach the location of the pipeline emergency.

As shown in FIGS. 5C and 15, the user can select or request (block 283), and the software 37 can identify and display (block 285), contact personnel assigned primary responsibility for the pipeline equipment 65 involved in the pipeline emergency. This enables the user to quickly access and notify proper personnel using any available communication media or message service to prepare them to implement the proper course of action dealing with the pipeline emergency. Once a course of action has been determined, the personnel are contacted (block 287) and provided information necessary to implement the determined course of action.

Advantageously, the user is provided the ability to identify sources of support in dealing with a pipeline emergency. The user can request external agencies (block 289) and the software can display (block 291) a list of external agencies along with contact information obtained from an external agency computer 161 to assist a user in locating a nearby external agency to provide support in the event of a pipeline emergency.

Advantageously, as best shown in FIG. 6, the user can also request (block 301) and the software 37 can display (block 303) nearby cities and pipeline facilities to thereby assist the user in identifying at least one city and at least one pipelines facility near a user selected pipeline or other pipeline equipment 65 which may provide added city related resources, and, with respect to nearby pipeline facilities, may provide the user the identity of additional sources of internal support necessary to either prosecute a pipeline emergency or to prosecute routine maintenance and repairs, especially where the pipeline work area is remote from the main pipeline facility. The user can select (block 305), and the software can display (block 307), a specifically desired city or facility to extract detailed information necessary to analyze the resources that can be provided. The knowledge of the geographic relation of a nearby city to a user selected pipeline or other pipeline equipment 65 can also provide the user an improved ability to access any environmental impact on the local populace when dealing with a pipeline leak or rupture. The knowledge of the geographic relation of a pipeline facility to the selected pipeline or other pipeline equipment 65 can also provide the user a forward operating base of operation in order to prosecute a pipeline emergency or to prosecute any necessary repairs or maintenance. Note, as with most of the functional features of the present invention related to examining specific pipeline related data, the user may zoom-in or zoom-out graphically with respect to the selected structure such as, for example, a piece of pipeline equipment, local city, or pipeline facility to examine the selected items geographic relationship within the context of the pipeline environment.

As shown in FIG. 7, an embodiment of the present invention includes the capability of creating and geographically relating pipeline incident reports. Specifically, the user, through the user interface 45, can select (block 311) and the software can display (block 313) a list or geographic plot of pipeline incidents (FIG. 16). The user can then select (block 315) and the software 37 can display (block 317) a specific pipeline incident to thereby allow a user to select and display an incident report record 121 for the at least one displayed incident location. The listing of pipeline incidents along with the geographic location of the incidents provides the user with not only ready access to historical records but also the ability to ascertain trend information along with the geographic environment which can aid the user in determining a cause-effect relationship between the environment and a pipeline having more than one incident. Additionally, the information may prompt the user to develop additional maintenance procedures such as implementing additional corrosion control methodologies as known by those skilled in the art.

Figure 8:
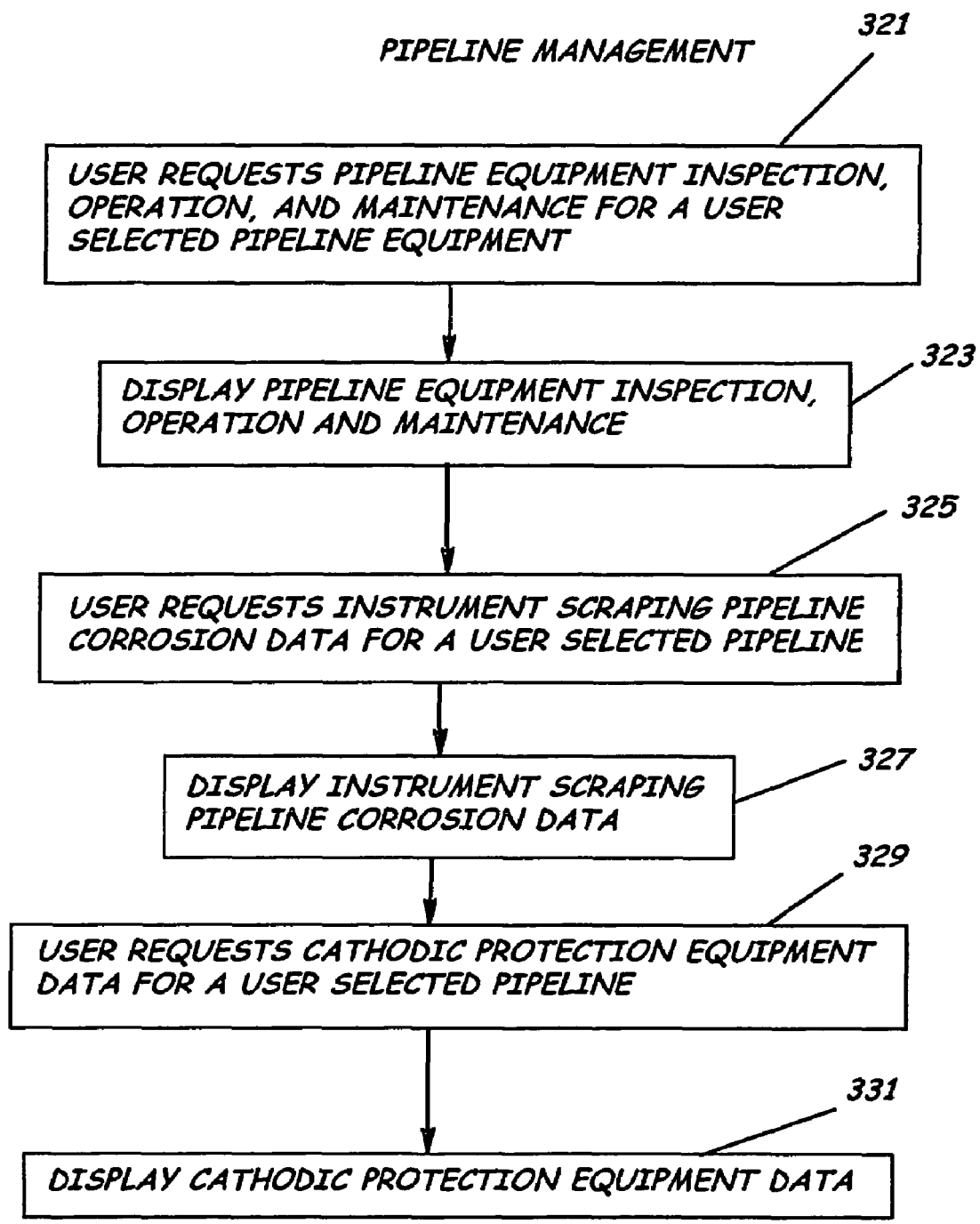
FIG. 8 is a flowchart of a method for facilitating pipeline management depicting accessing data from a pipeline management record according to an embodiment of the present invention.
Figure 9:
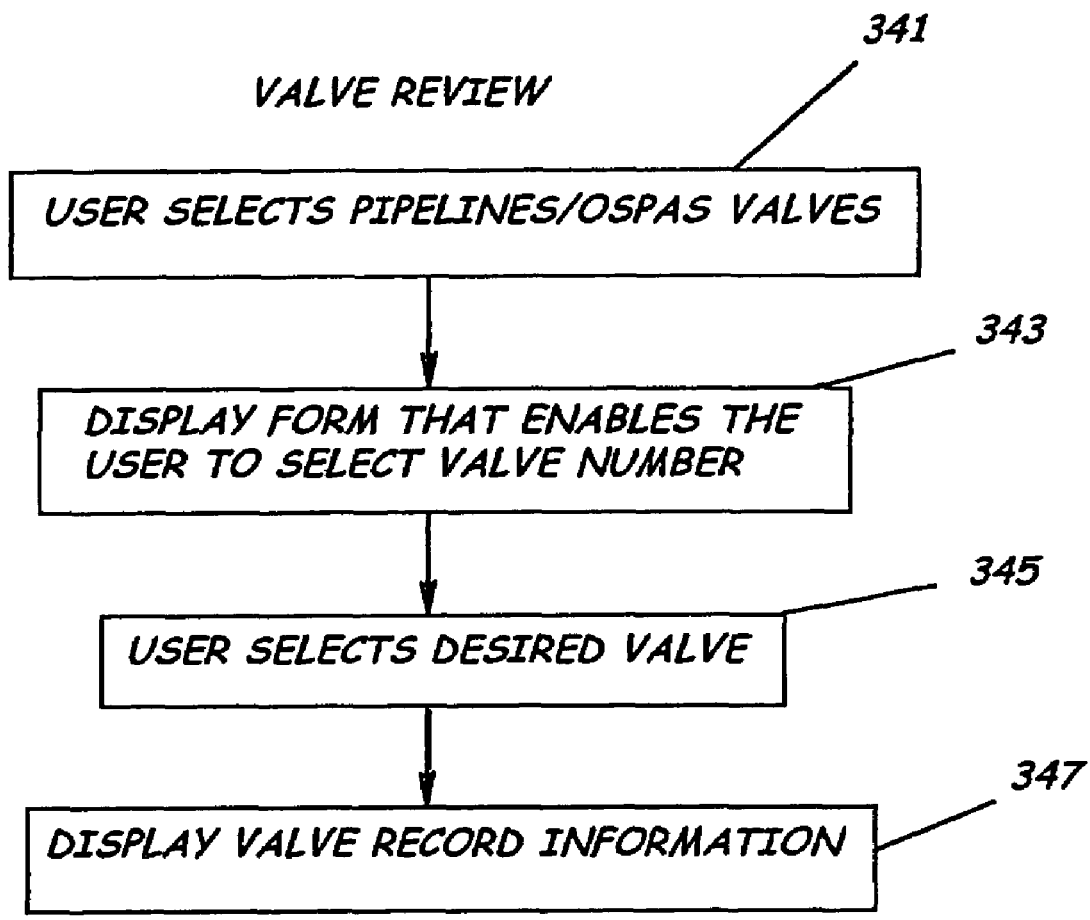
FIG. 9 is a an illustrative flowchart of a method for facilitating pipeline management depicting review of a pipeline equipment record according to an embodiment of the present invention.

Advantageously, an embodiment of the present invention also includes a functional method for facilitating pipeline management. Shown in FIG. 8 is a subset of steps of the method which include the user requesting (block 321), and the software 37 displaying (block 323) pipeline equipment inspection, operation, and maintenance data stored in at least one of a plurality of pipeline management records 53 in the database reset for a user selected piece of pipeline equipment 65 to assist in planning and execution of repairs to the user selected pipeline equipment 65. Also, the user, through the user interface 45 (FIG. 17), can request (block 325) and the software 37 can display (block 327) instrument scraping pipeline corrosion data from a pipeline corrosion record 127 stored in the database 47 for a user selected pipeline 135 to assist the user in planning and execution of repairs to the user selected scrapeable pipeline. The user can also, through the user interface 45 and a list of user selectable pipelines 135 (FIG. 17), request (block 329) and the software can display (block 331) cathodic protection equipment data from a pipeline cathodic protection equipment record 129 stored in the database 47 for the user selected pipeline 135 to assist the user in planning, implementation, repositioning, or replacement of cathodic protection resources to the user selected pipeline. These features provide the user with a geographically related spatial orientation with respect to the various stages of pipeline operations and maintenance, and thus, can aid the user in improved efficiency in both pipeline operations and maintenance, not otherwise available to the user.

Advantageously an embodiment of the present invention also provides the user the functionality to review, in detail, individual pipeline equipment components. Shown in FIG. 9, for illustrative purposes only, is but one methodology of accessing and displaying an individual pipeline valve according to the preferred embodiment of selecting various pieces of pipeline equipment 65. The user, through the user interface 45 and a list of user selectable pipelines 135 (FIG. 17), selects (block 341) pipelines/in-line valves (OSPAS) from a graphically displayed main menu bar (FIG. 10) of the pipeline information management analyzing software 37. The software 37 displays a form that enables the user to select a specific valve number (block 343). The user then selects a desired valve (block 345). The software 37 displays the information contained in the valve's respective pipeline equipment record 51 (block 347). The user may repeat this process as necessary.

In the drawings and specification, there have been disclosed a typical preferred embodiment of the invention, and although specific terms are employed, the terms are used in a descriptive sense only and not for purposes of limitation.

The invention claimed is:

1. A pipeline management system to facilitate pipeline management, the system comprising:
a first pipeline company computer positioned at a pipeline company site to define a pipeline company server and having a processor, memory coupled to the processor to store software and database records therein, a graphical display coupled to the processor for displaying graphical images, and a user interface coupled to the processor to provide a user access to manipulate the software and database records;
a database stored in the memory of the pipeline company server and having a plurality of map segments each comprising at least one of a map, a processed satellite image, and an aerial photograph, a plurality of pipeline equipment records including at least one of engineering data, drawings, and respective pipeline equipment location data, and a plurality of pipeline management records including pipeline equipment management data and a plurality of personnel data records; and
pipeline information management analyzing software stored in memory of the server to analyze pipeline management requirements, the pipeline information management analyzing software including:
  a pipeline management identifier positioned to tag a corresponding one of the plurality of pipeline management records in the database with a respective pipeline management record identifier,
  a pipeline management analyzer positioned to retrieve the corresponding one of the plurality of pipeline management records by the respective pipeline management record identifier from the database and responsive to a user selecting a pipeline equipment through the user interface to display the corresponding one of the plurality of pipeline management records to the user to thereby assist the user in planning and execution of management actions on the user selected pipeline equipment,
  a pipeline equipment identifier positioned to tag a corresponding one of the plurality of pipeline equipment records in the database with a respective pipeline equipment record identifier, and
  a pipeline emergency response analyzer to analyze a pipeline rupture, the pipeline emergency response analyzer including:
    a pipeline valve location locator positioned to retrieve at least one of the plurality of pipeline equipment records having pipeline valve location data from the database and responsive to a geographic reference point entered by the user through the user interface and representing a location of the pipeline rupture to identify at least one immediate upstream valve and at least one immediate downstream valve from the location of the pipeline rupture, and
    a pipeline segment volume calculator responsive to the pipeline valve location locator determined identity of the at least one immediate upstream valve and the at least one downstream valve and positioned to calculate an amount of pipeline segment volume inventory between the at least one upstream valve and the at least one downstream valve to thereby determine potential lost inventory from the pipeline rupture, a critical engineering data and drawings analyzer positioned to retrieve critical engineering data and drawings from one of the plurality of pipeline equipment records from the database and responsive to the user selecting the pipeline equipment through the user interface to display critical engineering data and drawings for the user selected pipeline equipment, a pipeline equipment distance calculator positioned to retrieve a pipeline equipment location data from the one of the plurality of pipeline equipment records from the database and responsive to the user selecting the pipeline equipment through the user interface to display distance measurements of the selected pipeline equipment from a pipeline reference point to determine travel time required to reach a destination work area, and an assigned personnel determiner positioned to retrieve a personnel data record containing pipeline equipment assignment information from the database and responsive to the user selecting at least one of a particular pipeline equipment and a pipeline operational area through the user interface to display contact personnel assigned primary responsibility for the user selected at least one of the particular pipeline equipment and the pipeline operational area.

2. A system as defined in claim 1, wherein the at least one immediate upstream valve and the at least immediate downstream valve identified by the pipeline valve location locator includes at least one of an in-line valve and a non-in-line valve.

3. A system as defined in claim 1, wherein the pipeline emergency response analyzer of the pipeline information management analyzing software further includes:

a rupture exposure radius determiner positioned to retrieve at least one of the plurality of map segments and at least one of the plurality of pipeline equipment records from the database and responsive to one geographic reference point entered by the user through the user interface representing location of the pipeline rupture to identify a rupture exposure radius coverage area of a rupture pipeline and to provide summary information about pipeline equipments within the rupture exposure radius coverage area.

4. A system as defined in claim 1, wherein the pipeline information management analyzing software further includes:

a graphics generator positioned to retrieve at least one of the plurality of map segments from the database and at least one of the plurality of pipeline equipment records from the database and responsive to one geographic reference point entered by the user through the user interface to display a graphical representation of the at least one of the plurality of map segments and the at least one of the plurality of pipeline equipment of the at least one of the plurality of pipeline equipment records on the graphical display; and wherein the geographic reference point supplied by the user through the user interface and utilized by the graphics generator is supplied through use of at least one of a geographic map coordinate entered in a text box of the graphical display and a user selectable hyperlink attached to a pipeline equipment and displayed on the at least one of the plurality of map segments from the database.

5. A system as defined in claim 1, wherein the database further includes a plurality of pipeline incident report records, wherein each pipeline incident report record is entered by the user through the user interface to be stored in the database, and wherein the pipeline information management analyzing software further includes a pipeline emergency incident location displayer positioned to retrieve one of the plurality of pipeline incident report records from the database and responsive to a user request through the user interface to display at least one incident location and responsive to the user selecting at least one incident location to display an incident report record for at least one displayed incident location selected by the user.

6. A system as defined in claim 1, wherein pipeline information management system analyzing software further comprises:

a pipeline equipment analyzer responsive to the user selecting pipeline equipment through the user interface to display pipeline equipment inspection, operation, and maintenance data stored in the at least one of the plurality of pipeline management records in the database to assist in planning and execution of repairs to the user selected pipeline equipment.

7. A system as defined in claim 1, wherein the database further includes a plurality of pipeline corrosion records, and wherein the pipeline information management system analyzing software further comprises:

a instrument scraping pipeline corrosion identifier positioned to tag a pipeline corrosion record entered by the user through the user interface with a pipeline corrosion record identifier for storage in the database; and an instrument scraping pipeline corrosion analyzer positioned to retrieve at least one of the plurality of pipeline corrosion records by the pipeline corrosion record identifier from the database and responsive to the user selecting a pipeline through the user interface to display instrument scraping pipeline corrosion data to assist the user in planning and execution of repairs to the user selected pipeline.

8. A system as defined in claim 1, wherein the database further includes a plurality of pipeline cathodic protection equipment records, and wherein the pipeline information management system analyzing software further comprises:

a cathodic protection equipment identifier positioned to tag a cathodic protection equipment record entered by the user through the user interface with a cathodic protection equipment record identifier for storage in the database; and a cathodic protection equipment analyzer positioned to retrieve at least one of the plurality of cathodic protection equipment records by the cathodic protection equipment record identifier from the database and responsive to the user selecting the pipeline through the user interface to display cathodic protection equipment data to assist the user in planning and implementation of cathodic protection resources to the user selected pipeline.

9. A system as defined in claim 1, further comprising:

an area network in communication with the server; and a remote user computer in communication with the area network, positioned remote from the server at a user site, and positioned to access the pipeline information management analyzing software to transmit at least one of geographic data and pipeline equipment data to the pipeline information management analyzing software and to retrieve at least one of the plurality of map segments, the plurality of pipeline equipment records, and the plurality of pipeline management records from the database.

10. A system as defined in claim 9, further comprising a portable user computer adapted to interface with the area network, positioned remote from the server at a user site, and adapted to retrieve the plurality of map segments, the plurality of pipeline equipment records, and the plurality of pipeline management records from the database to display a pipeline equipment work location associated with at least one pipeline equipment and adapted to transmit an updated pipeline management record to the server through the area network to be stored in the database to reflect pipeline equipment work accomplished on the pipeline equipment associated with the pipeline equipment work location.

11. A system as defined in claim 9, further comprising an external agency computer positioned at a external agency site, in communication with the pipeline company server through the area network, having memory associated therewith, having geographic information system-based software stored in the memory, and positioned to locate at least one of a plurality of nearby external agencies, and wherein the pipeline information management system analyzing software further comprises an external agency analyzer in communication with the external agency geographic information system-based software through the area network and responsive to the user selecting pipeline equipment through the user interface to display at least one of the plurality of nearby external agencies to the user to locate a nearby external agency to provide support in the event of a pipeline emergency.

12. A system as defined in claim 1, wherein the database further includes a plurality of local city records, and wherein the pipeline information management analyzing software further comprises:
    a cities identifier positioned to tag a local city record in the database with a city record identifier; and
    a cities analyzer positioned to retrieve the city record by the city record identifier from the database and responsive to the user selecting the pipeline equipment through the user interface to display at least one local city location record to the user to thereby assist the user in identifying at least one city near the user selected pipeline equipment.

13. A system as defined in claim 12, wherein the database further includes a plurality of pipeline facilities records, and wherein the pipeline information management analyzing software further comprises:
    a pipeline facilities identifier positioned to tag a pipeline facilities record in the database with a pipeline facilities record identifier; and
    a pipeline facilities analyzer positioned to retrieve the pipeline facilities record by the pipeline facilities record identifier from the database and responsive to the user selecting the pipeline equipment through the user interface to display at least one pipeline facilities record to the user to thereby assist the user in identifying at least one pipeline facility near the user selected pipeline equipment.

14. A pipeline management system to facilitate pipeline management, the system comprising:
    a first pipeline company computer positioned at a pipeline company site to define a pipeline company server and having a processor, memory coupled to the processor to store software and database records therein, a graphical display coupled to the processor for displaying graphical images, and a user interface coupled to the processor to provide a user access to manipulate the software and database records;
    a database stored in the memory of the pipeline company server and having a plurality of map segments each comprising at least one of a map, a processed satellite image, and an aerial photograph, a plurality of pipeline equipment records including at least one of engineering data, drawings, and respective pipeline equipment location data, and a plurality of pipeline management records including pipeline equipment management data and a plurality of personnel data records; and pipeline information management analyzing software stored in memory of the server to analyze pipeline management requirements, the pipeline information management analyzing software including:
        a pipeline emergency response analyzer to analyze a pipeline rupture, the pipeline emergency response analyzer including a pipeline valve location locator positioned to retrieve a plurality of pipeline equipment records having pipeline valve location data from the database and responsive to a geographic reference point entered by a user through the user interface and representing a location of the pipeline rupture to identify at least one immediate upstream valve and at least one immediate downstream valve from the location of the pipeline rupture, and
        a critical engineering data and drawings analyzer positioned to retrieve a pipeline equipment record containing critical engineering data and drawings from the database and responsive to the user selecting a pipeline equipment through the user interface to display critical engineering data and drawings for the user selected pipeline equipment.

15. A system as defined in claim 14, wherein the pipeline emergency response analyzer of the pipeline information management analyzing software further includes a pipeline segment volume calculator responsive to the pipeline valve location locator determined identity of the at least one immediate upstream valve and the at least one downstream valve and positioned to calculate an amount of pipeline segment volume inventory between the at least one upstream valve and the at least one downstream valve to thereby determine potential lost inventory from the pipeline rupture.

16. A system as defined in claim 14, wherein the pipeline information management analyzing software further includes a pipeline equipment distance calculator positioned to retrieve at least one of the plurality of the pipeline equipment records containing respective pipeline equipment location data from the database and responsive to the user selecting the pipeline equipment through the user interface to display distance measurements of the selected pipeline equipment from a pipeline reference point to determine travel time required to reach a destination work area.

17. A system as defined in claim 14, wherein the pipeline information management analyzing software further includes an assigned personnel determiner positioned to retrieve a personnel data record containing pipeline equipment assignment information from the database and responsive to the user selecting at least one of a plurality of pipeline equipment of the at least one of the plurality of pipeline equipment records and a pipeline operational area through the user interface to display contact personnel assigned primary responsibility for the user selected at least one of at least one of a plurality of pipeline equipment of the at least one of the plurality of pipeline equipment records and the pipeline operational area.

18. A system as defined in claim 14, wherein the at least one immediate upstream valve and the at least immediate downstream valve identified by the pipeline valve location locator includes at least one of an in-line valve and a non-in-line valve.

19. A system as defined in claim 14, wherein the emergency response analyzer of the pipeline information management analyzing software further includes a rupture exposure radius determiner positioned to retrieve at least one of the plurality of map segments and at least one of the plurality of pipeline equipment records from the database and responsive to one geographic reference point entered by the user through the user interface representing a location of the pipeline rupture to identify a rupture exposure radius coverage area of a rupture pipeline and to provide summary information about pipeline equipments within the rupture exposure radius coverage area.

20. A system as defined in claim 14, wherein the pipeline information management analyzing software further includes:
  a graphics generator positioned to retrieve at least one of the plurality of map segments from the database and at least one of the plurality of pipeline equipment records from the database and responsive to one geographic reference point entered by the user through the user interface to display a graphical representation of the at least one of the plurality of map segments and the at least one pipeline equipment of the at least one of the plurality of pipeline equipment records on the graphical display; and wherein
  the geographic reference point supplied by the user through the user interface and utilized by the graphics generator is supplied through use of at least one of a geographic map coordinate entered in a text box of the graphical display and a user selectable hyperlink attached to a pipeline equipment and displayed on the at least one of the plurality of map segments from the database.

21. A system as defined in claim 14, wherein the database further includes a plurality of pipeline incident report records, wherein each pipeline incident report record is entered by the user through the user interface to be stored in the database, and wherein the pipeline information management analyzing software further includes a pipeline emergency incident location displayer positioned to retrieve one of the plurality of pipeline incident report records from the database and responsive to a user request through the user interface to display at least one incident location and responsive to the user selecting at least one incident location to display an incident report record for at least one displayed incident location selected by the user.

22. A system as defined in claim 14, wherein pipeline information management system analyzing software further comprises:
  a pipeline management analyzer positioned to retrieve one of the plurality of pipeline management record from the database and responsive to the user selecting pipeline equipment through the user interface to display the retrieved pipeline management record to the user to thereby assist the user in planning and execution of management actions on the user selected pipeline equipment; and
  a pipeline equipment analyzer responsive to the user selecting pipeline equipment through the user interface to display pipeline equipment inspection, operation, and maintenance data stored in at least one of the plurality of pipeline management records in the database to assist in planning and execution of repairs to the user selected pipeline equipment.

23. A system as defined in claim 14, wherein the database further includes a plurality of pipeline corrosion records, and wherein the pipeline information management system analyzing software further comprises an instrument scraping pipeline corrosion analyzer positioned to retrieve at least one of the plurality of pipeline corrosion records from the database and responsive to the user selecting a pipeline through the user interface to display instrument scraping pipeline corrosion data to assist the user in planning and execution of repairs to the user selected pipeline.

24. A system as defined in claim 14, wherein the database further includes a plurality of pipeline cathodic protection equipment records, and wherein the pipeline information management system analyzing software further comprises a cathodic protection equipment analyzer positioned to retrieve at least one of the plurality of cathodic protection equipment records from the database and responsive to the user selecting a pipeline through the user interface to display cathodic protection equipment data to assist the user in planning and implementation of cathodic protection resources to the user selected pipeline.

25. A system as defined in claim 14, wherein the pipeline information management analyzing software further comprises a critical pipe determiner positioned to retrieve data from the database and responsive to the user selecting pipeline equipment through the user interface to display critical pipe associated with the user selected pipeline equipment.

26. A system as defined in claim 14, further comprising:
  an area network in communication with the server; and
  a remote user computer in communication with the area network, positioned remote from the server at a user site, and positioned to access the pipeline information management analyzing software to transmit at feast one of geographic data and pipeline equipment data to the pipeline information management analyzing software and to retrieve at least one of the plurality of map segments, the plurality of pipeline equipment records, and the plurality of pipeline management records from the database.

27. A system as defined in claim 26, further comprising a portable user computer interfaced with a Global Positioning System (GPS) and positioned remote from the server, adapted to interface with the area network and adapted to receive GPS updated coordinates and adapted to retrieve the plurality of map segments, the plurality of pipeline equipment records, and the plurality of pipeline management records from the database to display a pipeline equipment work location associated with at least one pipeline equipment and adapted to transmit an updated pipeline management record to the server through the area network to be stored in the database to reflect pipeline equipment work accomplished on the pipeline equipment associated with the pipeline equipment work location.

28. A system as defined in claim 26, further comprising an external agency computer positioned at a external agency site, in communication with the pipeline company server through the area network, having memory associated therewith, having geographic information system-based software stored in the memory, and positioned to locate at least one of a plurality of nearby external agencies, and wherein the pipeline information management system analyzing software further comprises an external agency analyzer in communication with the external agency geographic information system-based software through the area network and responsive to the user selecting pipeline equipment through the user interface to display at least one of the plurality of nearby external agencies to the user to locate a nearby external agency to provide support in the event of a pipeline emergency.

29. A system as defined in claim 14, wherein the database further includes a plurality of local, city records, and wherein the pipeline information management analyzing software further comprises a cities analyzer positioned to retrieve local city records from the database and responsive to the user selecting pipeline equipment through the user interface to display at least one local city record to the user to thereby assist the user in identifying at least one city near the user selected pipeline equipment.

30. A system as defined in claim 14, wherein the database further includes a plurality of pipeline facilities records, and wherein the pipeline information management analyzing software further comprises a pipeline facilities analyzer positioned to retrieve pipeline facilities records from the database and responsive to the user selecting pipeline equipment through the user interface to display at least one pipeline facilities record to the user to thereby assist the user in identifying at least one pipeline facility near the user selected pipeline equipment.

31. A system as defined in claim 14, further comprising a digitizer positioned to receive a plurality of map segments corresponding to the pipeline equipment location data entered by the user from at least one of a map, processed satellite image, and aerial photograph, and digitized by the digitizer, and wherein the pipeline information management analyzing software further includes a pipeline information management database preparer having a digitizer module positioned to receive from the digitizer and store in the database the plurality of map segments entered by the user, to enable the user to display geographic data related to the corresponding pipeline equipment.

32. A system as defined in claim 14, wherein the pipeline information management analyzing software further comprises a pipeline information management database preparer including:
 a pipeline linker responsive to a geographic reference point representing a geographic location of the pipeline equipment selected by the user and entered through the user interface and positioned to retrieve at least one of the plurality of map segments in the database and at least one of the plurality of pipeline equipment records from the database to link the user selected geographic location of the pipeline equipment to geographic data of the map segment for storage in the database; and
 a hyperlink attacher positioned to retrieve the at least one of the plurality of map segments in the database and the at least one of the plurality of pipeline equipment records and responsive to the link formed by the pipeline linker to add a user selectable hyperlink to the at least one of the plurality of map segments to select the at least one of the plurality of pipeline equipment records to be displayed on the graphical display device to provide graphical user selection of the pipeline equipment.

33. A system as defined in claim 14, wherein the pipeline information management analyzing software further comprises a connectivity verifier positioned to retrieve at least one of the plurality of map segments from the database and responsive to the user inputting a new map segment having a named pipeline vector into the database to verify connectivity of the named pipeline vector between the at least one of the plurality of map segments in the database and the new map segment to form a single vector line for each named pipeline between the plurality of map segments, the connectivity verifier including:
 a pipeline connectivity identifier positioned to tag a named pipeline vector entered by the user through the user interface with a pipeline connection identifier for assignment to the at least one of the plurality of map segments in the database containing the named pipeline vector;
 a map segment comparator positioned to retrieve each map segment in the database adjacent the new map segment having the same named pipeline vector to compare each map segment adjacent the new map segment having named pipeline vector to verify at least one pipeline vector map segment endpoint of the new map segment is aligned geographically with an end point of at least one adjacent map segment having the same named pipeline vector; and
 a map segment extrapolator responsive to the map segment comparator to extrapolate a geographic alignment of the at least one end point of the named pipeline vector of the new map segment with the at least one named pipeline vector end point of the adjacent map segment identified by the map segment comparator to have at least one pipeline vector map segment endpoint that is not aligned geographically with the corresponding pipeline vector map segment endpoint of the new map segment.

34. A pipeline information management analyzing software stored on a storage media to analyze pipeline management requirements, the software comprising a pipeline emergency response analyzer to analyze a pipeline rupture, the pipeline emergency response analyzer including:
 a pipeline valve location locator adapted to retrieve a plurality of pipeline equipment records having pipeline valve location data from a database and adapted to respond to a geographic reference point entered by a user through the user interface and representing a location of the pipeline rupture to identify at least one immediate upstream valve and at least one immediate downstream valve from the location of the pipeline rupture; and
 a critical engineering data and drawings analyzer adapted to retrieve one of the plurality of pipeline equipment records containing critical engineering data and drawings from the database and adapted to respond to a user selecting pipeline equipment through the user interface to display critical engineering data and drawings for the user selected pipeline equipment.

35. Software as defined in claim 34, wherein the pipeline emergency response analyzer of the pipeline information management analyzing software further includes a pipeline segment volume calculator responsive to the pipeline valve location locator determined identity of the at least one immediate upstream valve and the at least one immediate downstream valve and adapted to calculate an amount of pipeline segment volume inventory between the at least one upstream valve and the at least one downstream valve to thereby determine potential lost inventory from the pipeline rupture.

36. Software as defined in claim 34, wherein the emergency response analyzer of the pipeline information management analyzing software further includes a rupture exposure radius determiner adapted to retrieve at least one map segment and at least one pipeline equipment record from the database and adapted to respond to one geographic reference point entered by the user through the user interface representing a location of the pipeline rupture to identify a rupture exposure radius coverage area of a pipeline and to provide summary information about pipeline equipment within the rupture exposure radius coverage area.

37. Software as defined in claim 34, wherein the pipeline information management analyzing software further includes a pipeline equipment distance calculator adapted to retrieve one of the plurality of pipeline equipment records containing pipeline equipment location data from the database and adapted to respond to the user selecting a pipeline equipment through the user interface to display distance measurements of the selected pipeline equipment from a pipeline reference point to determine travel time required to reach a destination work area.

38. Software as defined in claim 34, wherein the pipeline information management analyzing software further includes an assigned personnel determiner adapted to retrieve a personnel data record containing pipeline equipment assignment information from the database and adapted to respond to the user selecting at least one of a pipeline equipment and a pipeline operational area through the user interface to display contact personnel assigned primary responsibility for the user selected at least one of a pipeline equipment and a pipeline operational area.

39. Software as defined in claim 34, wherein the pipeline information management analyzing software further includes a pipeline emergency incident location displayer adapted to retrieve a pipeline incident report record from the database and adapted to respond to a user request through the user interface to display at least one incident location and adapted to respond to the user selecting at least one incident location to display an incident report record for at least one displayed incident location selected by the user.

40. Software as defined in claim 34, wherein the pipeline information management system analyzing software further comprises an external agency analyzer adapted to communicate with an external agency computer through an area network and adapted to respond to the user selecting a pipeline equipment through the user interface to access and display at least one of a plurality of external agency records to the user to locate a nearby external agency to provide support in the event of a pipeline emergency.

41. Software as defined in claim 34, wherein the software further includes a pipeline management analyzer adapted to retrieve a pipeline management record from the database and adapted to respond to the user selecting a pipeline equipment through the user interface to display the pipeline management record to the user to thereby assist the user in planning and execution of management actions on the user selected pipeline equipment.

42. Software as defined in claim 34, wherein the pipeline information management analyzing software further includes a graphics generator adapted to retrieve at least one of a plurality of map segments from the database and at least one of the plurality of pipeline equipment records from the database and adapted to respond to one geographic reference point entered by the user through the user interface and adapted to interface with a graphical display to display a graphical representation of the at least one of the plurality of map segments and the at least one pipeline equipment of the at least one of the plurality of pipeline equipment records on the graphical display, and wherein the one geographic reference point supplied by the user through the user interface and utilized by the graphics generator is supplied through use of at least one of a geographic map coordinate entered in a text box of the graphical display and a user selectable hyperlink attached to a pipeline equipment and displayed on the at least one of the plurality of map segments from the database.

43. Software as defined in claim 34, wherein the pipeline information management analyzing software further comprises an instrument scraping pipeline corrosion analyzer adapted to retrieve at least one of a plurality of pipeline corrosion records from the database and adapted to respond to the user selecting a pipeline through the user interface to display instrument scraping pipeline corrosion data to assist the user in planning and execution of repairs to the user selected pipeline.

44. Software as. defined in claim 34, wherein the pipeline information management system analyzing software further comprises a cathodic protection equipment analyzer adapted to retrieve at least one of a plurality of cathodic protection equipment records from the database and adapted to respond to the user selecting a pipeline through the user interface to display cathodic protection equipment data to assist the user in planning and implementation of cathodic protection resources to the user selected pipeline.

45. Software as defined in claim 34, wherein the pipeline information management analyzing software further comprises a cities analyzer adapted to retrieve a local city record from the database and adapted to respond to the user selecting a pipeline equipment through the user interface to display at least one local city record to the user to thereby assist the user in identifying at least one city near the user selected pipeline equipment.

46. Software as defined in claim 34, wherein the pipeline information management analyzing software further comprises a pipeline facilities analyzer adapted to retrieve a pipeline facilities record from the database and adapted to respond to the user selecting a pipeline equipment through the user interface to display at least one pipeline facilities record to the user to thereby assist the user in identifying at least one pipeline facility near the user selected pipeline equipment.

47. A method for facilitating pipeline management, the method comprising the steps of:
  displaying pipeline equipment inspection, operation, and maintenance data stored in at least one of a plurality of pipeline management records in a database for a user selected pipeline equipment to assist in planning and execution of repairs to the user selected pipeline equipment;
  displaying instrument scraping pipeline corrosion data for a user selected pipeline to assist the user in planning and execution of repairs to the user selected pipeline; and
  displaying cathodic protection equipment data for the user selected pipeline to assist the user in planning and implementation of cathodic protection resources to the user selected pipeline.

48. A computer readable storage medium comprising a set of instructions that, when executed by the computer, cause the computer to perform the following operations:
  responsive to a geographic reference point representing a location of a pipeline rupture and entered by a user through a user interface, retrieving a plurality of pipeline equipment records having pipeline valve location data from a database, and identifying at least one immediate upstream valve and at least one immediate downstream valve from the location of the pipeline rupture; and
  responsive to the user selecting pipeline equipment through the user interface, retrieving a pipeline equipment record containing critical engineering data and drawings from the database, and displaying critical engineering data and drawings for the user selected pipeline equipment.

49. A computer readable storage medium according to claim 48, further comprising a set of instructions that, when executed by the computer, cause the computer to perform the following operation:

calculating an amount of pipeline segment volume inventory between the at least one upstream, valve and the at least one downstream valve to thereby determine potential lost inventory from the pipeline rupture.

50. A computer readable storage medium according claim 48, further comprising a set of instructions that, when executed by the computer, cause the computer to perform the following operations:

responsive to a geographic reference point entered by the user through the user interface representing a particular location of the pipeline rupture, retrieving at least one map segment and at least one pipeline equipment record from the database, identifying a rupture exposure radius coverage area of a pipeline, and providing summary information about pipeline equipment within the rupture exposure radius coverage area.

51. A computer readable storage medium according to claim 48, further comprising a set of instructions that, when executed by the computer, cause the computer to perform the following operations:

responsive to the user selecting a pipeline equipment through the user interface, retrieving a pipeline equipment record containing pipeline equipment location data from the database, displaying distance measurements of the selected pipeline equipment from a pipeline reference point, and determining travel time required to reach the selected pipeline equipment.

52. A computer readable storage medium according to claim 48, further comprising a set of instructions that, when executed by the computer, cause the computer to perform the following operations:

responsive to the user selecting at least one of a pipeline equipment and a pipeline operational area through the user interface, retrieving a personnel data record containing pipeline equipment assignment information from the database, and displaying contact personnel assigned primary responsibility for the user selected at least one of a pipeline equipment and a pipeline operational area.

53. A computer readable storage medium according to claim 48, further comprising a set of instructions that, when executed by the computer, cause the computer to perform the following operations:

responsive to a user request through the user interface, displaying at least one incident location; and responsive to the user selecting an incident location, displaying an incident report record for the selected incident location.

54. A computer readable storage medium according to claim 48, further comprising a set of instructions that, when executed by the computer, cause the computer to perform the following operations:

responsive to the user selecting pipeline equipment through the user interface, communicating with an external agency computer through an area network, and accessing and displaying at least one of a plurality of external agency records to the user, to thereby assist the user to locate a nearby external agency to provide support in the event of a pipeline emergency.

55. A computer readable storage medium according to claim 48, further comprising a set of instructions that, when executed by the computer, cause the computer to perform the following operations:

responsive to the user selecting pipeline equipment through a user interface, retrieving a pipeline management record from a database, and displaying the pipeline management record to the user, to thereby assist the user in planning and execution of management actions on the user selected pipeline equipment.

56. A computer readable storage medium according to claim 48, further comprising a set of instructions that, when executed by the computer, cause the computer to perform the following operations:

responsive to a geographic reference point entered by the user through the user interface, retrieving from the database at least one of a plurality of map segments from the database and at least one of the plurality of pipeline equipment records each associated with a pipeline equipment, interfacing with a graphical display, and displaying a graphical representation of the at least one of the plurality of map segments and the at least one pipeline equipment on the graphical display, the geographic reference point supplied by the user through the user interface through use of at least one of a geographic map coordinate entered in a text box of the graphical display and a user selectable hyperlink linked to the at least one pipeline equipment and displayed on at least one of the plurality of map segments.

57. A computer readable storage according to claim 48, further comprising a set of instructions that, when executed by the computer, cause the computer to perform the following operations:

responsive to the user selecting a pipeline through the user interface, retrieving at least one of a plurality of pipeline corrosion records from the database, and displaying instrument scraping pipeline corrosion data, to thereby assist the user in planning and execution of repairs to the user selected pipeline.

58. A computer readable storage medium according to claim 48, further comprising a set of instructions that, when executed by the computer, cause the computer to perform the following operations:

responsive to the user selecting a pipeline through the user interface, retrieving at least one of a plurality of cathodic protection equipment records from the database, and displaying cathodic protection equipment data, to thereby assist the user in planning and implementation of cathodic protection resources to the user selected pipeline.

59. A computer readable storage medium according to claim 48, further comprising a set of instructions that, when executed by the computer, cause the computer to perform the following operations:

responsive to the user selecting pipeline equipment through the user interface, retrieving a local city record from the database, and displaying at least one local city record to the user, to thereby assist the user in identifying at least one city near the user selected pipeline equipment.

60. A computer readable storage medium according to claim 48, further comprising a set of instructions that, when executed by the computer, cause the computer to perform the following operations:

responsive to the user selecting pipeline equipment through the user interface, retrieving a pipeline facilities record from the database, and displaying at least one pipeline facilities record to the user, to thereby assist the user in identifying at least one pipeline facility near the user selected pipeline equipment.

* * * * *